United States Patent
Stenzel et al.

(10) Patent No.: US 9,506,581 B2
(45) Date of Patent: *Nov. 29, 2016

(54) METHOD AND SYSTEM OF RETRIEVER SYSTEMS FOR MARINE GEOPHYSICAL SURVEY CABLES

(71) Applicant: PGS Geophysical AS, Oslo (NO)

(72) Inventors: Andre Stenzel, Sugar Land, TX (US); Youlin Hu, Sugar Land, TX (US); Troy L. McKey, III, La Place, LA (US)

(73) Assignee: PGS Geophysical AS, Oslo (NO)

( * ) Notice: Subject to any disclaimer, the term of this patent is extended or adjusted under 35 U.S.C. 154(b) by 0 days.

This patent is subject to a terminal disclaimer.

(21) Appl. No.: 15/050,013

(22) Filed: Feb. 22, 2016

(65) Prior Publication Data

US 2016/0169415 A1 Jun. 16, 2016

Related U.S. Application Data

(60) Division of application No. 14/481,366, filed on Sep. 9, 2014, now Pat. No. 9,316,334, which is a division of application No. 13/438,583, filed on Apr. 3, 2012, now Pat. No. 8,882,391, which is a continuation-in-part of application No. 13/193,796, filed on Jul. 29, 2011, now Pat. No. 8,753,038.

(51) Int. Cl.
*F16L 1/24* (2006.01)
*B63B 21/66* (2006.01)
*F16L 1/12* (2006.01)

(52) U.S. Cl.
CPC .................. *F16L 1/24* (2013.01); *B63B 21/66* (2013.01); *F16L 1/12* (2013.01)

(58) Field of Classification Search
CPC ....................................................... F16L 1/24
USPC ....... 405/171; 367/4, 20; 114/345, 242, 244, 114/245, 253; 441/2, 9, 10, 90–100, 133
See application file for complete search history.

(56) References Cited

U.S. PATENT DOCUMENTS

| | | |
|---|---|---|
| 2,838,731 A | 6/1958 | Cruzan et al. |
| 3,182,250 A | 5/1965 | Mayes |
| 3,669,311 A | 6/1972 | Folden, Jr. et al. |
| 3,909,774 A | 9/1975 | Pavey, Jr. |

(Continued)

OTHER PUBLICATIONS

Bal Seal Engineering, Inc. (n.d.), 2 pages. Retrieved from http://www.balseal.com/home (Jun. 6, 2011).

(Continued)

*Primary Examiner* — Sean Andrish

(57) ABSTRACT

Retriever systems for marine geophysical survey cables. At least some of the illustrative embodiments are methods including causing a submerged sensor streamer to surface. The causing may be by moving a piston within a cylinder of a housing coupled to the sensor streamer, the moving of the piston responsive to pressure exerted on a face of the piston as the sensor streamer reaches or exceeds a predetermined depth, wherein the pressure exerted on the face of the piston overcomes a latching force tending to hold the piston in place at depths above the predetermined depth; and responsive to the piston overcoming the force that latches the piston releasing a ballast weight, wherein prior to the releasing the ballast weight is at least partially held in place based on position of the piston, and the releasing responsive to movement of the piston.

6 Claims, 13 Drawing Sheets

(56) References Cited

U.S. PATENT DOCUMENTS

| | | |
|---|---|---|
| 4,298,840 A | 11/1981 | Bischoff et al. |
| 4,823,325 A | 4/1989 | Cole, Jr. |
| 4,928,262 A | 5/1990 | Neeley et al. |
| 5,076,468 A | 12/1991 | Mackal |
| 5,400,922 A | 3/1995 | Weinheimer et al. |
| 5,404,339 A | 4/1995 | Cole, Jr. |
| 5,509,576 A | 4/1996 | Weinheimer et al. |
| 6,019,652 A | 2/2000 | Nielsen et al. |
| 6,533,627 B1 | 3/2003 | Ambs |
| 6,612,886 B2 | 9/2003 | Cole, Jr. |
| 7,475,711 B2 | 1/2009 | Fawcell, Jr. et al. |
| 7,540,796 B2 | 6/2009 | Spears et al. |
| 8,469,634 B2 | 6/2013 | Stenzel |
| 9,316,334 B2 * | 4/2016 | Stenzel .................... F16L 1/24 |
| 2011/0049449 A1 | 3/2011 | Scott |
| 2014/0241122 A1 | 8/2014 | Ponceau et al. |
| 2014/0355379 A1 | 12/2014 | Moldoveanu et al. |

OTHER PUBLICATIONS

Fike Corporation (n.d.). Bursting discs and rupture disk protection from Fike, 2 pages. Retrieved from http://www.fike.com/products/rupturediscs.asp (Apr. 2, 2012).

McMaster-Carr (n.d.), 12 pages. Retrieved from http://www.mcmaster.com (Apr. 3, 2012).

* cited by examiner

METHOD AND SYSTEM OF RETRIEVER SYSTEMS FOR MARINE GEOPHYSICAL SURVEY CABLES

CROSS-REFERENCE TO RELATED APPLICATIONS

This application is a divisional of U.S. application Ser. No. 14/481,366 filed Sep. 9, 2014 titled "Method and System of Retriever Systems for Marine Geophysical Survey Cables," which is a divisional of U.S. patent application Ser. No. 13/438,583 filed Apr. 3, 2012 titled "Method and System of Retriever Systems for Marine Geophysical Survey Cables" now U.S. Pat. No. 8,882,391, which is a continuation-in-part of U.S. patent application Ser. No. 13/193,796 filed Jul. 29, 2011 titled "Method and system of a marine geophysical survey cable retriever" now issued as U.S. Pat. No. 8,753,038, all of which are incorporated by reference herein as if reproduced in full below.

BACKGROUND

Marine survey systems are used to acquire data (e.g., seismic, electromagnetic) regarding earth formations below a body of water such as a lake or ocean. The marine survey systems typically use a plurality of sensor streamers which contain one or more sensors disposed proximate an outer jacket.

In some situations, one or more sensor streamers may be disconnected from the survey system, the disconnection possibly caused by failure of a coupling mechanism or in some situations the sensor streamer may be severed (e.g., by the propeller of a passing vessel). In some failure scenarios, particularly with sensor streamers filled with alcohol or oil, the sensor streamer becomes negatively buoyant, thus tending to sink. In order to avoid complete loss of the sensor streamer, an inflatable balloon system may trigger (i.e., a retriever system), which causes the sensor streamer to surface.

BRIEF DESCRIPTION OF THE DRAWINGS

For a detailed description of exemplary embodiments, reference will now be made to the accompanying drawings in which.

NOTATION AND NOMENCLATURE

Figure 1:
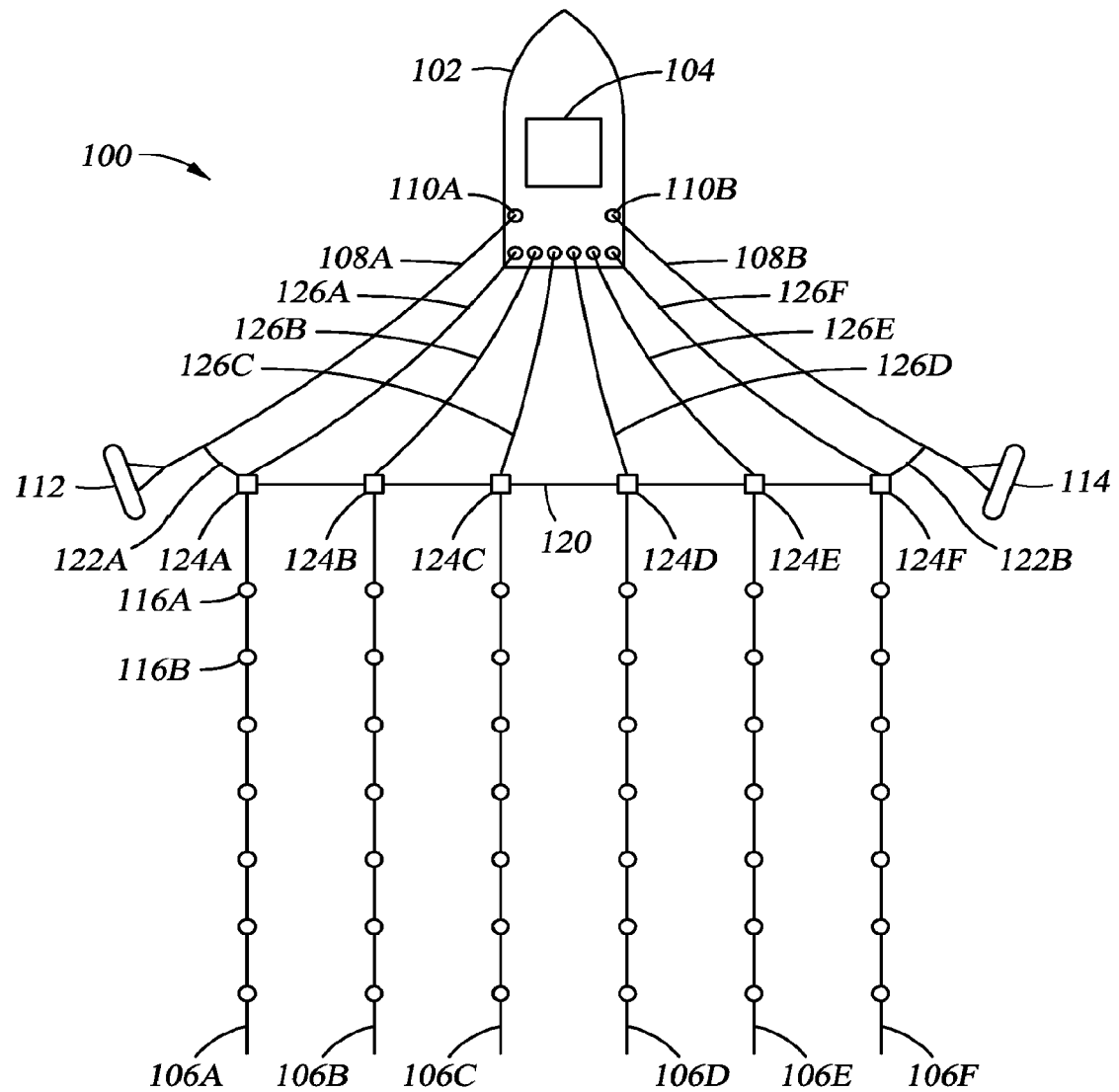
FIG. 1 shows an overhead view of marine survey system in accordance with at least some embodiments.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Cable" shall mean a flexible, axial load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"About" shall mean plus or minus five percent (5%) of the recited value.

"Gas" in reference to a substance shall refer to the state of the substance at standard atmospheric pressure and temperature. The fact that a substance may be a liquid at certain pressures and/or temperatures shall not obviate the substance's status as a gas.

"Non-triggered" with respect to a depth trigger mechanism or components thereof shall mean that the depth trigger mechanism is armed and has yet to change operational state from the armed condition.

"Triggered" with respect to a depth trigger mechanism or components thereof shall mean that the depth trigger mechanism has changed operational state responsive to reaching or exceeding a predetermined depth.

DETAILED DESCRIPTION

The following discussion is directed to various embodiments of the invention. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be exemplary of that embodiment, and not intended to intimate that the scope of the disclosure or the claims is limited to that embodiment.

Various embodiments are directed to retriever systems for geophysical survey cables used in marine surveys. More particularly, at least some embodiments are directed to depth trigger mechanisms for retriever systems including lifting bag systems, ballast weight systems, or both. The ballast weight system enables the user to compensate the cable for buoyancy changes caused by, for example, differences in salinity and temperature of the water within which the marine survey will be performed. However, the ballast weight system may also selectively shed or jettison the ballast weights when the survey cable reaches a predetermined depth indicative of potential loss. The ballast weight system may work in conjunction with a selectively deployable lifting bag system. The specification first turns to an illustrative marine survey system to orient the reader, and then to example embodiments.

FIG. 1 shows an overhead view of a marine survey system 100 in accordance with at least some embodiments. In particular, FIG. 1 shows a survey vessel 102 having onboard equipment 104, such as navigation, energy source control, and data recording equipment. Survey vessel 102 is configured to tow one or more streamers 106A-F through the water. While FIG. 1 illustratively shows six streamers 106, any number of streamers 106 may be used. The discussion continues with respect to streamers 106 being sensor streamers, but streamers 106 are illustrative of any towed geophysical survey cable, such as transmitter cables and source cables.

In the illustrated embodiment, the sensor streamers 106 are coupled to towing equipment that maintains the streamers 106 at selected depth and lateral positions with respect to each other and with respect to the survey vessel 102. The towing equipment may comprise two paravane tow lines 108A and 108B each coupled to the vessel 102 by way of winches 110A and 1106, respectively. The winches enable changing the deployed length of each paravane tow line 108A and 108B. The second end of paravane tow line 108A is coupled to a paravane 112, and the second end of paravane tow line 108B is coupled to paravane 114. In each case, the tow lines 108A and 108B couple to their respective paravanes through respective sets of lines called a "bridle". The paravanes 112 and 114 are each configured to provide a lateral force component to the various elements of the survey system when the paravanes are towed in the water. The combined lateral forces of the paravanes 112 and 114 separate the paravanes from each other until the paravanes put one or more spreader lines 120, coupled between the paravanes 112 and 114, into tension. The paravanes 112 and 114 either couple directly to the spreader line 120, or as illustrated couple to the spreader line by way of spur lines 122A and 122B.

As illustrated, the sensor streamers 106 are each coupled, at the ends nearest the vessel 102 (i.e., the proximal ends) to a respective lead-in cable termination 124A-F. The lead-in cable terminations 124A-F are coupled to or are associated with the spreader lines 120 so as to control the lateral positions of the streamers 106 with respect to each other and with respect to the vessel 102. Electrical and/or optical connections between the appropriate components in the onboard equipment 104, such as the recording system and the sensors (e.g., 116A, 116B) in the streamers 106 may be made using inner lead-in cables 126A-F. Much like the tow lines 108A and 108B associated with respective winches 110A and 1106, each of the lead-in cables 126A-F may be deployed by a respective winch or similar spooling device such that the deployed length of each lead-in cable 126A-F can be changed. As would be understood by one of ordinary skill in the art with the benefit of this disclosure, the illustrated towing equipment may be used alone or in conjunction with other lateral position and depth control equipment. Other embodiments may have more complex or simpler towing arrangements.

Figure 2:
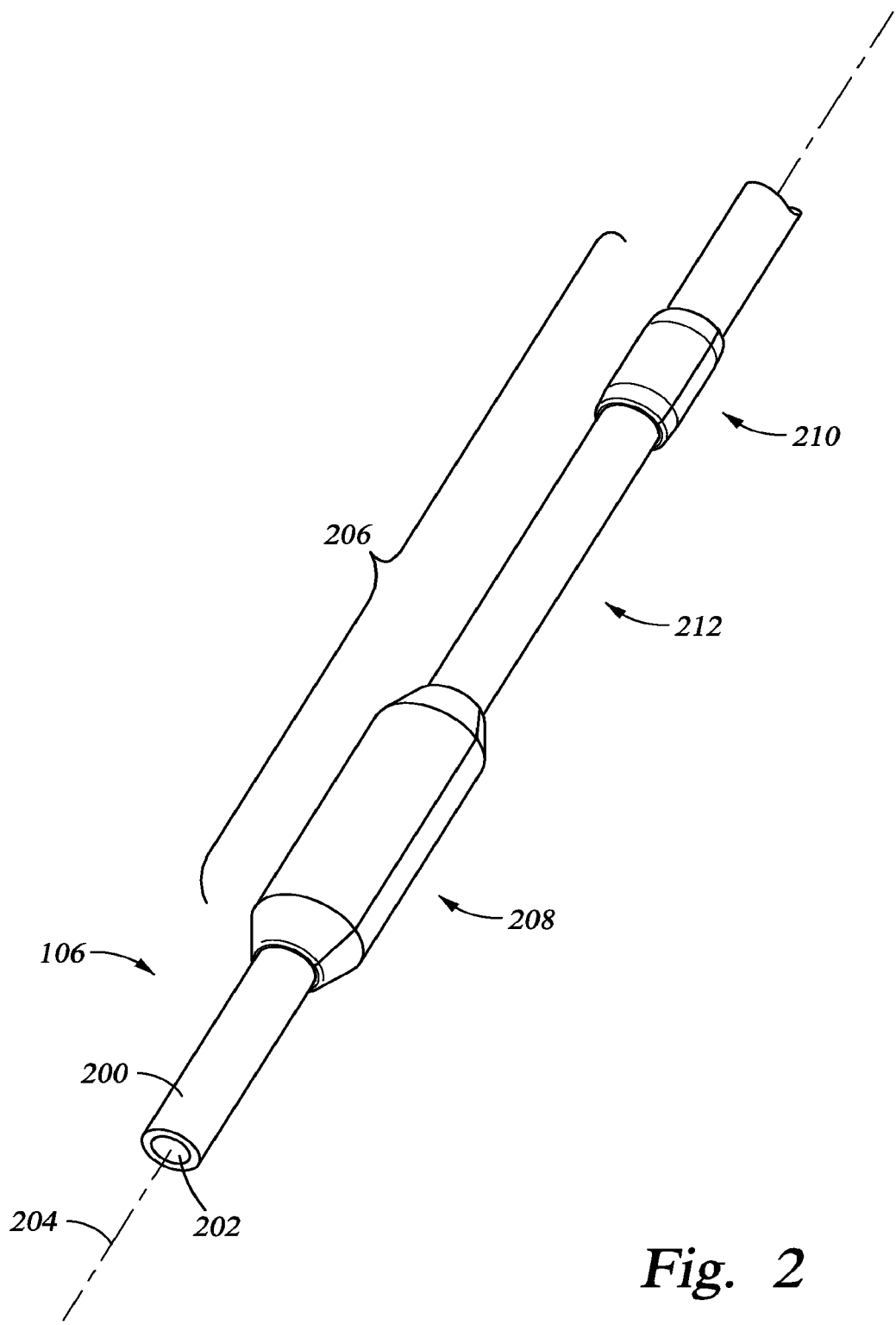
FIG. 2 shows a perspective view of a retriever system in accordance with at least some embodiments.

FIG. 2 shows a perspective view of a retriever system in accordance with at least some embodiments. In particular, FIG. 2 shows a portion of a sensor streamer 106. The sensor streamer 106 has an elongated outer jacket 200 that defines an interior volume 202. The elongated outer jacket defines a central axis 204. Though not specifically shown in FIG. 2, various sensors (e.g., hydrophones, geophones, electromagnetic sensors) associated with the sensor streamer 106 reside within interior volume 202 or on elongated outer jacket 200 and are spaced longitudinally along the sensor streamer 106.

FIG. 2 further shows a retriever system 206 in accordance with at least some embodiments. In particular, retriever system 206 comprises a lifting bag system 208, and in some embodiments a ballast weight system 210. While FIG. 2 only shows one retriever system 206, it will be understood that a sensor streamer may have a length on the order of about 5000 to 15000 meters, and thus a plurality of such retriever systems 206 may be spaced along and thus associated with each sensor streamer 106. As illustrated, a portion 212 of the elongated outer jacket 200 may reside between the lifting bag system 208 and ballast weight system 210, and the portion 212 may comprise one or more sensors. In some cases, the retriever systems associated with a sensor streamer may be evenly spaced along the elongated outer jacket, and further the individual lifting bag systems and ballast weight systems evenly spaced, but such even spacing is not strictly required. The specification first turns to the lifting bag system 208 in accordance with various embodiments, and then turns to the ballast weight system 210.

Figure 3:
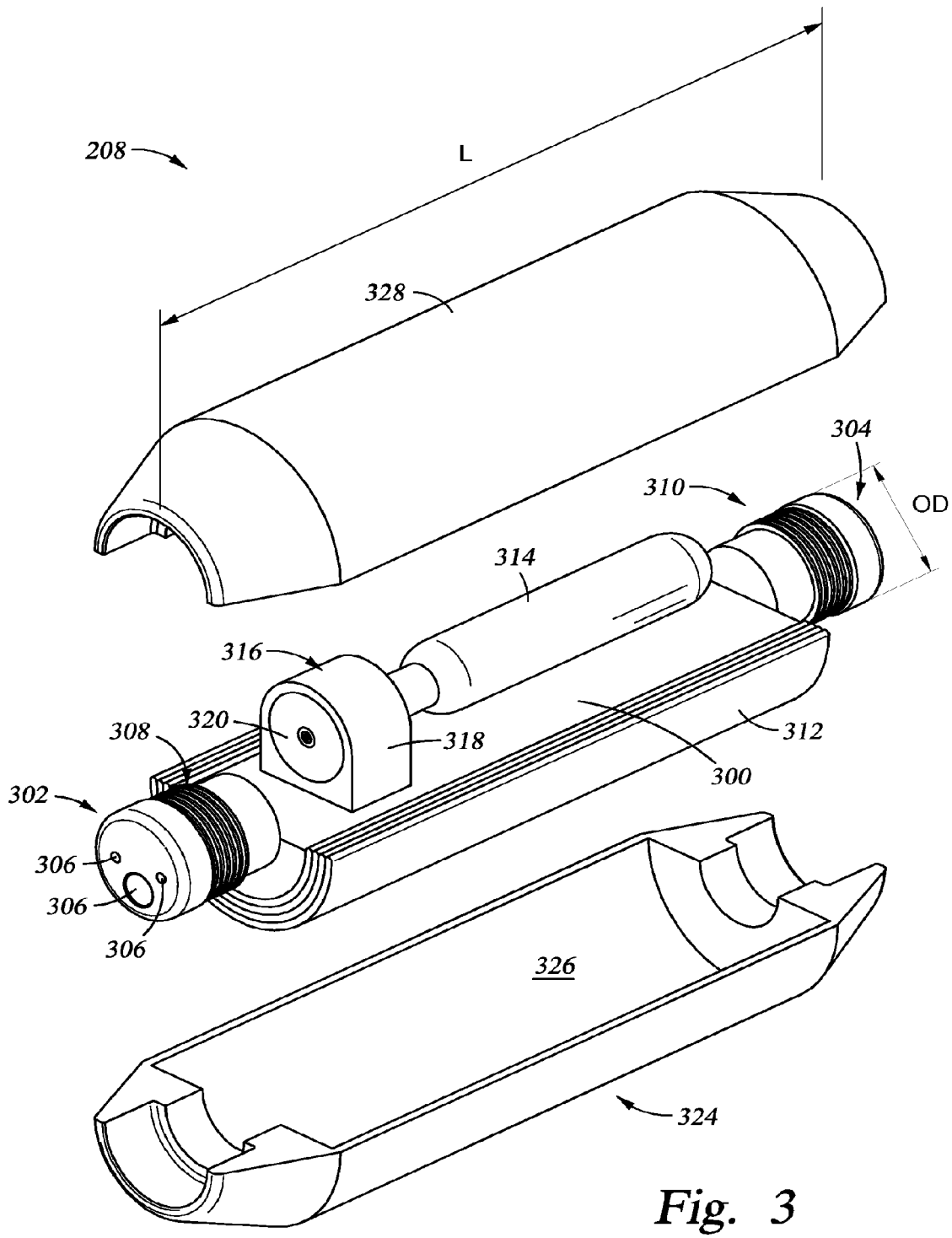
FIG. 3 shows an exploded perspective view of a lifting bag system in accordance with at least some embodiments.

FIG. 3 shows an exploded perspective view of a lifting bag system 208 (in a non-deployed condition) in accordance with at least some embodiments. In particular, the illustrative lifting bag system 208 comprises a bag attachment block 300 that defines a first end 302 and opposite second end 304, both of circular cross-sections. The bag attachment block defines a plurality of passages 306 that extend between the first end 302 and the second end 304 of the bag attachment block. It is through the passages 306 that ropes as strength members, as well as various electrical and/or communicative conductors of the sensor streamer 106, pass such that power may be provided to the sensors and/or readings taken from the sensors. The first end 302 and second end 304 define an outside diameter (OD) sized to couple to an inside diameter of the elongated outer jacket 200 of the sensor streamer 106. In some cases, the first end 302 and second end 304 may comprise a plurality of grooves 308 and 310, respectively, to assist in the coupling of the ends 302 and 304 to the elongated outer jacket 200. The grooves may take any suitable form, such as rectangular grooves, triangular grooves, or grooves similar to threads, just to name a few. The bag attachment block 300 (including the ends 302 and 304) may be made from any suitable material keeping in mind that the buoyancy of the sensor streamer (with the lifting bag system 208 in a non-deployed state) is designed to be approximately neutrally buoyant. Thus, the bag attachment block 300 may be made from materials such as high density plastic, or light metals such as titanium or aluminum. Other materials, and combinations of materials, may be also be used.

The lifting bag system 208 further comprises a bag 312. FIG. 3 shows the lifting bag system 208 with the bag 312 in a deflated and stowed state. When deflated and stowed the bag 312 is folded such the amount of space used to store the bag within the lifting bag system 308 is reduced. The bag 312 in its inflated state may take any suitable shape, such as round or rectangular. When deployed, the bag itself may mechanically couple to the bag attachment block 300 and support the weight of the sensor streamer. In other cases, the bag may be held within a net or lattice of ropes mechanically coupled to the bag attachment block 300. The material from which the bag 312 is constructed may take any suitable form. In some cases, the bag 312 material may be a plastic material, plastic coated fabric, rubber, rubber coated fabric, or water tight or water resistant material. The bag may also be elastically or plastically expandable.

In order to inflate the bag 312 when needed, the lifting bag system 208 further comprises gas cylinder 314 coupled to the bag attachment block 300. The gas cylinder 314 comprises a compressed gas that, when selectively released by depth trigger mechanism 316, inflates the bag 312. The compressed gas within the cylinder 314 may take any suitable form, such as compressed air, compressed nitrogen, compressed carbon dioxide, or other gas. In at least some embodiments, the compressed gas is held at a pressure and temperature where the gas becomes a liquid. More particularly, in some embodiments the compressed gas in the cylinder 314 is liquid carbon dioxide.

The lifting bag system 208 further comprises a depth trigger mechanism 316. When the depth of the lifting bag system 208 meets or exceeds a predetermined depth (e.g., 60 meter), the depth trigger mechanism 316 fluidly couples the compressed gas from the gas cylinder 314 to the internal volume of the bag 312 such that the bag 312 inflates. Illustrative depth trigger mechanism 316 defines an outer housing 318 into which a cylinder bore 320 is created. Associated with the cylinder bore 320 are various components that trigger when the lifting bag system 208 reaches or exceeds the predetermined depth. At least one component of the depth trigger mechanism 316 is exposed to the ambient pressure of the water. It is noted that being exposed to the ambient pressure does not necessarily mean being directly exposed to the sea water. Mechanisms for exposing the components to the ambient pressure without directly exposing the components to the sea water are discussed more below. Generically stated, the trigger mechanism 316 is a mechanical system where increasing depth (i.e., increasing ambient pressure) results in movement of at least one component within the cylinder bore 320. Movement of the at least one component punctures a seal of the gas cylinder 314, which couples the compressed gas to the bag 312. Various trigger mechanisms are discussed more below.

Still referring to FIG. 3, the lifting bag system 208 further comprises outer cover 324. In some embodiments, the outer cover 324 is a single frangible unit designed and constructed to break away as the bag 312 begins to inflate. Illustrative outer cover 324 is shown as comprising two halves 326 and 328. The covers 326 and 328 may couple to each other and/or a portion of the bag attachment block 300 as appropriate. In a particular embodiment, the outer covers 326 and 328 are designed and constructed to separate from each other as the bag 312 begins to inflate. In another embodiment, the outer covers 326 and 328 are assembled to form the overall outer cover 324 but may be frangible, breaking into smaller pieces as the bag 312 begins to inflate. The outer cover may be made of any suitable material, such as a plastic material.

Figure 4:
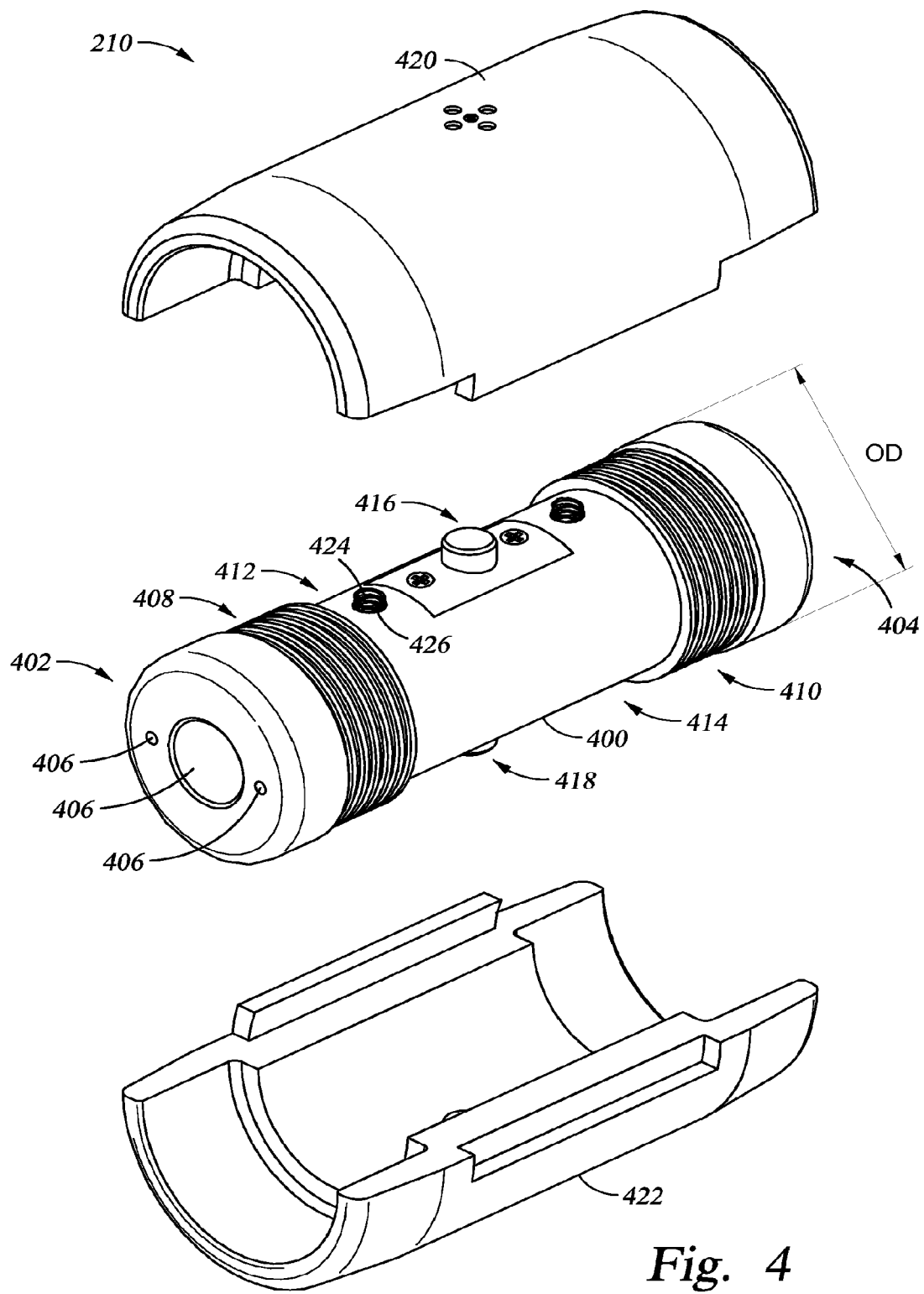
FIG. 4 shows an exploded perspective view of ballast system in accordance with at least some embodiments.

The retriever system 206 in accordance with at least some embodiments further comprises a ballast system 210. FIG. 4 shows an exploded, perspective view of a ballast system 210 in accordance with at least some embodiments. In particular, the illustrative ballast system 210 comprises a ballast attachment block 400 that defines a first end 402 and opposite second end 404, both of circular cross-sections. The ballast attachment block defines a plurality of passages 406 that extend between the first end 402 and the second end 404. It is through the passages 406 that ropes as strength members, as well as various electrical and/or communicative conductors of the sensor streamer 106, pass. The first end 402 and second end 404 define an outside diameter (OD) sized to couple to an inside diameter of the elongated outer jacket 200 of the sensor streamer 106. In some cases, the first end 402 and second end 404 may comprise a plurality of grooves 408 and 410, respectively, to assist in the coupling of the ends 402 and 404 to the elongated outer jacket 200. The grooves may take any suitable form, such as rectangular grooves, triangular grooves, or grooves similar to threads, just to name a few. The ballast attachment block 400 (including the ends 402 and 404) may be made from any suitable material keeping in mind that the buoyancy of the sensor streamer is designed to be approximately neutrally buoyant. Thus, the ballast attachment block 400 may be made from materials such as high density plastic, or light metals such as titanium or aluminum. Other materials, and combinations of materials, may be also be used.

Illustrative ballast attachment block 400 defines a first attachment location 412 and a second attachment location 414. In the illustrative embodiments of FIG. 4, the attachment locations are not necessarily structurally defined, except in relation to the depth trigger mechanisms 416 and 418, respectively (only the piston portion of depth trigger mechanisms 416 and 418 visible in FIG. 4). In other cases, the attachment locations 412 and 414 may be structurally delineated, such as by grooves, indentions, and/or areas of reduced diameter of the ballast attachment block 400.

The ballast system 210 further comprises a first ballast weight 420 and a second ballast weight 422. It is noted that while FIG. 4 shows the first ballast weight 420 in the upper orientation, and second ballast weight 422 in the lower configuration, any rotational orientation of the weights is possible. Though FIG. 4 is a perspective view, in an operational configuration the first ballast weight 420 abuts the ballast attachment block 400 at the first attachment location 412, and if used the second ballast weight 422 abuts the ballast attachment block 400 in the second attachment location 414. In the illustrative embodiments of FIG. 4, the ballast weights 420 and 422 mechanically couple to the ballast attachment block 400 by way of their depth trigger mechanisms 416 and 418, respectively. Example depth trigger mechanisms are discussed more below, including depth trigger mechanisms with different physical arrangements than that of FIG. 4.

In some cases, the ballast system 210 may comprise one or more springs 424 within counter-bores 426. When illustrative ballast weight 420 is coupled to the ballast attachment block 400, the spring 424 may compress, which compression may be used to help eject the ballast weight 420 away from ballast attachment block 400 when the ballast system has reached or exceeded the predetermined depth. FIG. 4 shows two spring and counter-bore systems associated with the first attachment location 412, but one or more such spring and counter-bore systems may be used. The second ballast attachment location 414 may likewise comprise one or more spring and counter-bore systems, but such are not visible in the view of FIG. 4.

The ballast weights may be constructed of any suitable substance. For example, in some cases the ballast weights are lead or bronze. In at least some embodiments, each ballast weight 420, 422 weighs approximately 1 kilogram.

Thus, if both ballast weights are attached to the ballast attachment block 400, the ballast system 210 may add approximately 2 kilograms to the overall weight of the attached sensor streamer. The ballast weights are added to ballast attachment blocks along the length of a sensor streamer to adjust the buoyancy of the sensor streamer. That is, the sensor streamer may be designed and constructed to be substantially neutrally buoyant in water of a particular salinity and temperature. However, marine surveys may be taken in a variety of locations and a variety of local conditions, and thus the ballast weights may be added and/or removed at the surface to compensate for the specific salinity and temperature of water expected. In cases where only one ballast weight is used at a particular ballast attachment block, a dummy cover, weighing substantially less than a ballast weight, may be placed at the unused attachment location.

Figure 5:
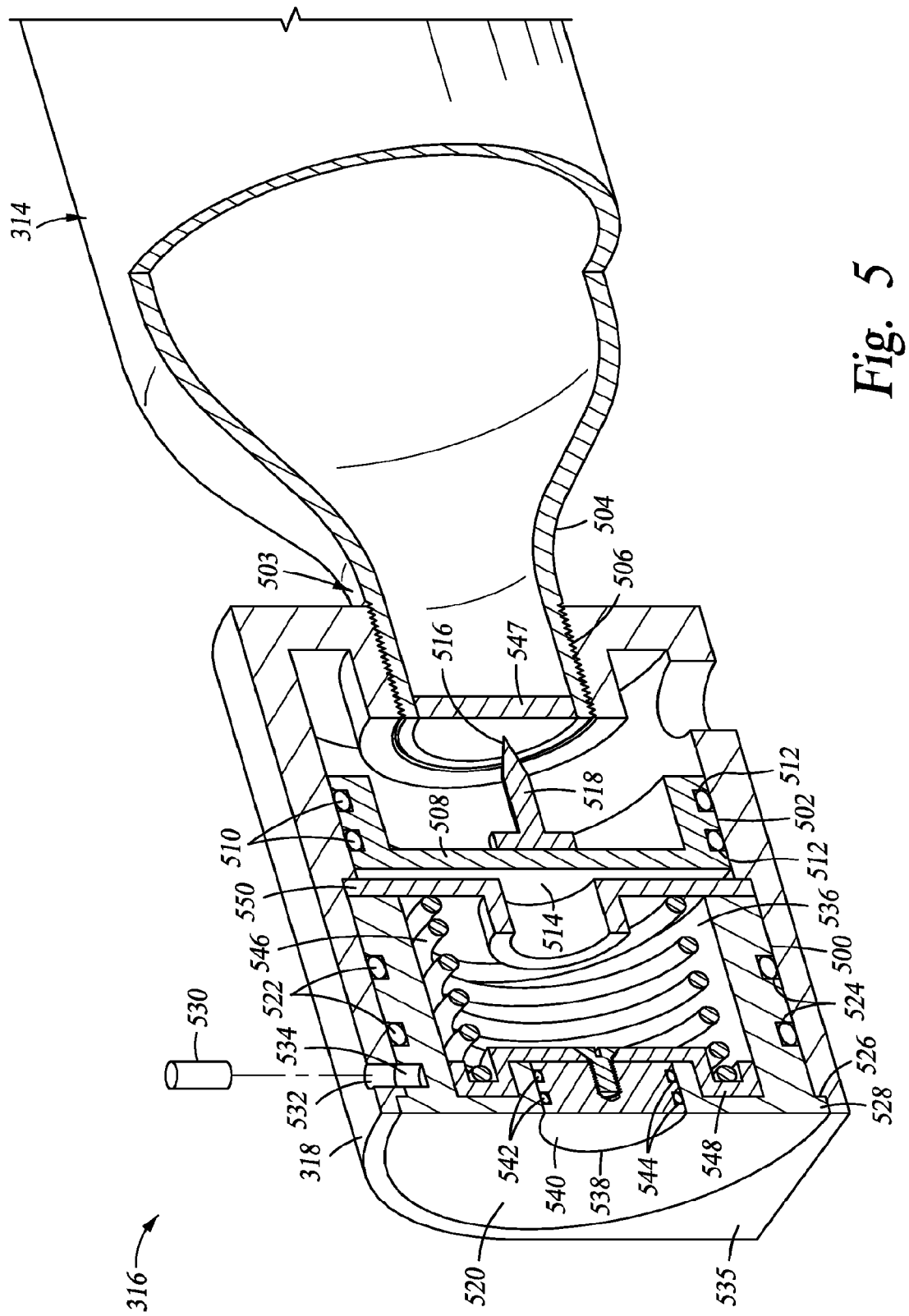
FIG. 5 shows a perspective cross-sectional view of a depth trigger mechanism for a lifting bag system in accordance with at least some embodiments.

The specification now turns to various embodiments of the depth trigger mechanisms, starting with the depth trigger mechanism for the lifting bag system 208. FIG. 5 shows a cross-sectional perspective view of a depth trigger mechanism 316 coupled to a gas cylinder 314 in accordance with at least some embodiments. In particular, the depth trigger mechanism 316 comprises outer housing 318. The outer housing may be made of any suitable material, but copper-based alloys (e.g., brass, beryllium copper) may offer the good resistance to fouling by sea creatures, such as barnacles. A counter-bore within the outer housing 318 defines a cylinder bore of a first inside diameter 500, and a second inside diameter 502 slightly less than the first inside diameter 500. In other embodiments a single inside diameter may be used. In an example embodiment, the inside diameter 500 may be about 2.5 centimeters (cm), and the inside diameter 502 may be about 2.4 cm, but larger or smaller inside diameters may be used.

The outer housing 318 further defines another counter-bore 503 within which the neck 504 of the gas cylinder 314 may be inserted and coupled. In some cases, the inside diameter of the counter-bore 503 may be threaded, and likewise the outside diameter of the neck 504 of the gas cylinder may be threaded, and thus the gas cylinder 314 couples to the outer housing 318 by way of a threaded connection 506. Other mechanisms to couple the gas cylinder 314 to the outer housing 318 may be used. Likewise, other mechanisms to seal the gas cylinder 314 to the housing 318 may be used (e.g., an o-ring seal).

Disposed within the inside diameter 502 is a puncture piston 508. The puncture piston may be made of the same material as the outer housing (e.g., copper-based alloys), but since the puncture piston 508 is not continuously exposed to sea water other materials may also be used. An outside diameter of the puncture piston 508 seals against the inside diameter 502 of the cylinder bore by way of o-rings 510 within respective annular grooves 512. While FIG. 5 shows two annular grooves 512 and two o-rings 510, one or more o-ring and annular groove systems may be used. While the o-rings 510 seal against the inside diameter 502 of the cylinder bore, the o-rings nevertheless enable movement of the puncture piston 508 within the cylinder bore. That is, as the pressure increases against the inner face 514 of the puncture piston 508, the piston is pushed inwardly toward the gas cylinder 314. Situations where pressure acting against the inner face 514 are discussed more below. Likewise, when the depth trigger mechanism is triggered at depth, the pressure released from the gas cylinder 314 may tend to push the puncture piston 508 in the opposite direction.

The depth trigger mechanism 316 illustrated in FIG. 5 further comprises lance member 516 coupled to the puncture piston 508 and disposed within the outer housing 318. As the name implies, the lance member 516 is used to lance or puncture the seal of the gas cylinder 314 when the depth trigger mechanism 316 reaches or exceeds the predetermined depth. The lance member 516 may be made of hardened steel. As illustrated, the lance member 516 couples to the puncture piston 508. The coupling mechanism between the lance member 516 and the puncture piston 508 may take any suitable form, such as by way of one or more fasteners (e.g., a fastener through inner face 514 and into the lance member 516, or fasteners through portions of the lance member 516 and then into the puncture piston 508). In other cases, the puncture piston 508 may define a threaded aperture into which the lance member 516 threads. Other connection mechanisms are possible. The lance member 516 defines a sharpened point 518, which in the illustrative case of FIG. 5 is in the form of a spear. The lance member 516 may also be shaped in other forms to shear, puncture, and/or pierce open the seal of the cylinder containing compressed gas.

The illustrative depth trigger mechanism 316 further comprises a cap member 520. The cap member may be made of any suitable material, but copper-based alloys (e.g., brass, beryllium copper) may the good resistance to fouling by sea creatures, such as barnacles. In the illustrative case of FIG. 5, the cap member 520 telescopes within the internal diameter 500 of the cylinder bore. An outside diameter of the cap member 520 seals against the inside diameter 500 of the cylinder bore by way of o-rings 522 within respective annular grooves 524. While FIG. 5 shows two annular grooves 524 and two o-rings 522, one or more o-ring and annular groove systems may be used. Unlike the puncture piston 508, the cap member 520 may be held stationary relative to the outer housing 318. As illustrated, the cap member 520 is held against further inward movement by shoulder region 526 defined in the outer housing 318, and corresponding flange feature 528 defined in the cap member 520. In addition to, or in place of, the shoulder region 526 and flange feature 528, inward movement of the cap member 520 may also be limited by the shoulder created between inside diameter 500 and inside diameter 502.

Once the cap member 520 is telescoped within the inside diameter 500, the cap member 520 may be held against outward movement by any suitable mechanism, such as pin 530 telescoped within aperture 532 of the outer housing 318 and into counter-bore 534 in the cap member 520. Use of shoulder region 526 and flange feature 528, and/or the pin 530 and related aperture 532 and counter-bore 534, is merely illustrative. Any suitable mechanism that, once installed, limits the movement of the cap member 520 may be used (e.g., threaded connection). Moreover, while illustrative cap member 520 telescopes within and seals against inside diameter 500, the cap member may also telescope over the outer housing 318, and/or seal against the outer face 535 of the outer housing 318.

Still referring to FIG. 5, the illustrative cap member 520 is disposed at the distal end of the cylinder bore opposite the puncture piston 508, and the puncture piston 508 disposed at the proximal end (i.e., closest to the cylinder 314). The volume between the face 514 of the puncture piston 508 and the cap member 520 is referred herein as an intermediate chamber 536. The cap member 520 further comprises an aperture 538 that, when not blocked, fluidly couples ambient pressure outside the depth trigger mechanism 316 to the intermediate chamber 536. As shown (i.e., in the non-triggered state), however, the aperture 538 is sealed by way of a seal piston 540. An outside diameter of the seal piston 540 seals against the internal diameter of the aperture 538 by way of o-rings 542 within respective annular grooves 544. In an example embodiment, the outside diameter of the seal piston 540 may be 0.5 cm, but larger or smaller seal piston diameters may be used based on the predetermined depth and the device(s) (discussed more below) that tend to hold the seal piston against inward movement. While FIG. 5 shows two annular grooves 544 and two o-rings 542, one or more o-ring and annular groove systems may be used. Likewise, in other embodiments, the annular grooves may be defined within the inside diameter of the aperture 538.

The depth trigger mechanism 316 of FIG. 5 is shown in the non-triggered state—the seal piston 540 is sealed within the aperture 538, and the lance member 516 has not punctured the seal 547. The puncture piston 508 and lance member 516 remain in the non-triggered state so long as the differential pressure across the puncture piston 508 is relatively low. That is, so long as the pressure within the intermediate chamber 536 is about the same or lower than the pressure on the lance 516 side of the puncture piston 508, insufficient force will be exerted on the puncture piston 508 to move the puncture piston 508 and/or for the lance 516 to puncture the seal 547. Inasmuch as the depth trigger mechanism 316 is assembled into the non-triggered state at the surface (i.e., non-submerged), and the intermediate chamber 536 is sealed by the various o-rings, the differential pressure across the puncture piston 508 is about equal for submerged depths above the predetermined depth.

However, as the submerged depth of the depth trigger mechanism increases, the ambient pressure of the water acting on the outer face of the seal piston 540 creates a force. In accordance with various embodiments, an opposing force is created by one or members disposed within intermediate chamber 536, the opposing force opposes the force applied by the ambient water. Stated otherwise, one or more members disposed within intermediate chamber 536 create force tending to hold the seal piston 540 in the closed orientation at depths above the predetermined depth. The one or more members in the intermediate volume may take many forms. As illustrated in FIG. 5, in some embodiments the force tending to hold the seal piston 540 in the closed orientation is provided by a spring 546.

Still referring to FIG. 5, in some embodiments a spring 546 is disposed within the intermediate chamber 536 and is mechanically coupled to the seal piston 540. As illustrated, the spring 546 may couple to the seal piston 540 by way of a connection member 548. The illustrative connection member 548 in FIG. 5 couples to the seal piston 540 by way of a fastener, but any suitable connection mechanism may be used. Moreover, depending on the diameter of the seal piston 540 and size of the spring, the spring 546 may directly contact the seal piston 540, and in such embodiments the connection member may be omitted. The spring 546 may be supported on the end opposite the seal piston 540 by way of a backing member 550. The backing member 550 may be coupled to the cap member 520, or the backing member 550 may be held in place between the shoulder created between inside diameter 500 and 502 on one side, and the cap member 520 on the other side. In some cases, in the non-triggered state the spring 546 may be uncompressed, and in other cases in the non-triggered state the spring 546 may be compressed, all dependent upon the predetermined depth, cross-sectional area of the seal piston, and the like. The specification now turns to operation of the illustrative depth trigger mechanism 316 of FIG. 5.

Again, illustrative depth trigger mechanism 316 of FIG. 5 is shown in the non-triggered state. As the depth trigger mechanism 316 is submerged, the ambient pressure created by the surrounding water increases. Thus, as the depth increases so too does the force created by the ambient pressure pushing against the outer face of the seal piston 540. With increasing depth, but above the predetermined depth, the seal piston 540 may be forced inwardly (i.e., forced into the intermediate chamber 536). However, in the embodiments of FIG. 5 the spring 546 applies a force opposing the force created by the ambient water pressure acting on the outer face the seal piston 540, and as the spring compresses the force increases proportional to the spring constant for the spring. Nevertheless, at depths above the predetermined depth, the spring 546 holds the seal piston 540 in sealing relationship with the internal diameter of the aperture 538. It is noted that at depths very near but still above the predetermined depth, the seal piston 540 may be forced inwardly to the point that at least one o-ring seal is lost (i.e., the seal piston 540 moved inwardly to the point the o-ring no longer contacts the internal diameter of the aperture 538), but even a single o-ring seal between the seal piston 540 and the aperture 538 may be sufficient to seal the intermediate chamber 536 from water intrusion, and thus such a condition shall still be considered a non-triggered state.

As the depth trigger mechanism 316 submerges below the predetermined depth, the force supplied by the spring 546 is overcome by the ambient pressure of the water acting on the outer face of the seal piston 540, and thus the seal piston 540 moves inwardly enough to allow water to flood the intermediate chamber 536. That is, the seal piston 540 moves to a triggered state, which enables water to flood the intermediate chamber 536. When water enters the intermediate chamber 536, pressure in the intermediate chamber 536 increases significantly. As the pressure increases against the inner face 514 of the puncture piston 508 by the water pressure entering the intermediate chamber 536, the puncture piston 508 is pushed inwardly toward the gas cylinder 314. Movement of the puncture piston 508 and lance 516 thus cause the lance 516 to puncture the seal 547, which inflates lifting bag 312. At some point, the pressure within the intermediate chamber 536 may equalize with the ambient water pressure, and thus the seal piston 540 may once again telescope within the aperture 538; however, by this point the seal 547 of the cylinder 314 has been punctured and the lifting bag deployed.

Figure 6:
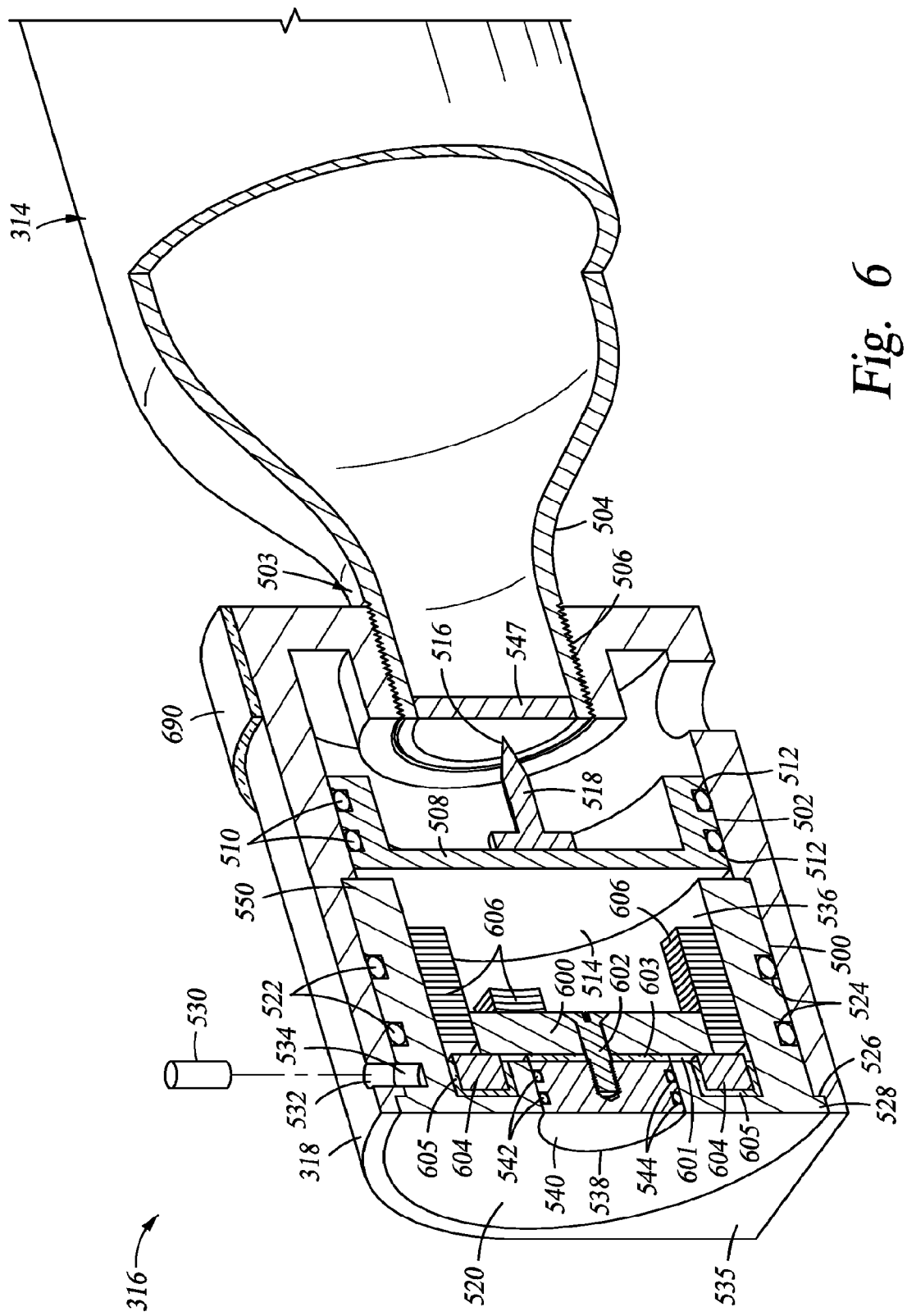
FIG. 6 shows a perspective cross-sectional view of a depth trigger mechanism for a lifting bag system in accordance with at least some embodiments.

FIG. 6 shows a cross-sectional perspective view of a depth trigger mechanism 316 coupled to a gas cylinder 314 in accordance with yet still further embodiments. Many of the components and relationships between components as between FIGS. 5 and 6 are the same. So as not to unduly complicate the description, duplicate components will carry the same reference numbers and will not be specifically re-introduced with respect to FIG. 6. The operational philosophy of the embodiments of FIG. 6 is the same as for FIG. 5; however, the force tending to hold the seal piston 540 in the closed or non-triggered state is developed differently in FIG. 6. More particularly, the embodiments of FIG. 6 comprise a magnet 600 disposed within the intermediate chamber 536 and mechanically coupled to the seal piston 540. The magnet 600 may couple to the seal piston 540 by any suitable mechanism, and as illustrated the magnet 600 couples to the seal piston by way of a fastener 602 telescoped through the magnet 600 and threadingly coupled to the seal piston 540. In some cases, and as illustrated, the magnet 600 may be arranged such that a spacer 603 separates the magnet 600 from the seal piston to reduce thermal transfer to the magnetic. An air gap, much like air gap 601 between the cap 520 and the magnet 600, may also be used for the same purpose. In other cases, the magnetic 600 may directly abut the seal piston 540.

As illustrated, the magnet 600 takes the form of a circular disk having an outside diameter smaller than inside diameter 500. However, the magnet 600 may take any suitable form (e.g., square, hexagonal) so long as the magnet 600 physically fits within the internal diameter 500. In some embodiments, the magnet 600 may have an outside diameter only slightly smaller than inside diameter 500, and in such embodiments the magnet 600 may further comprise one or more apertures (in addition to the aperture for the fastener 602) to enable water flooding into the intermediate chamber 536 to reach the puncture piston 508 (i.e., in the triggered state). Some permanent magnets are subject to de-magnetization based on reaching a predetermined temperature and/or experiencing thermal shock. While temperature at depth is not an issue, the overall mechanism 316 may experience relatively high temperatures, for example, when sitting on the deck of a vessel in direct sunlight. In order to reduce the chances of overheating the magnet 600 (and in some cases magnetic material 604), the outer housing 318 may be coated and/or covered with a thermal insulation layer 690. So as not to unduly complicate the figure, the thermal insulation layer 690 is shown only partially covering the outer housing 318, but in some cases any surface subject to direct sunlight may be covered with the thermal insulation layer 690 (including cylinder 314). The thermal insulation layer 690 may take any suitable form that reduces thermal transfer and/or provides mechanical isolation (e.g., reduces thermal shock), for example, rubber, plastic, or fabric.

The magnet 600 may magnetically couple to one or more components of the illustrative depth trigger mechanism 316 of FIG. 6 in order to provide the latching force for the seal piston 540. In some cases, the cap member 520 may be constructed of a magnetic material such that magnet 600 is magnetically attracted to the cap member 520. In other cases, the cap member 520 may be constructed of a non-magnetic material, and thus an additional magnetic material 604 (as illustrated, an annular ring of rectangular cross-section) may be disposed within the intermediate chamber 536 and mechanically coupled to the cap member 520. In some cases, the magnetic material 604 may merely be a material upon which a magnetic force is applied in the presence of a magnetic fields (e.g., steel). In other cases, the magnetic material 604 is itself a magnet with the magnetic poles arranged such that the force as between magnet 600 and the magnetic material 604 is an attractive force. Suitable magnets may be purchased from a variety of sources, such as McMaster-Carr of Atlanta, Ga. Magnetic material 604 in the form of a magnet may likewise be adversely affected by temperature and/or mechanical shock, and thus in some cases the magnetic material 604 may be disposed within a liner 605, which liner 605 may provide thermal insulation properties and/or mechanical isolation.

In at least some of the magnetic embodiments, the depth trigger mechanism may further comprise one more guide rails 606 disposed with the intermediate chamber 536. In the illustrated embodiments, the guide rails 606 are disposed on an inside diameter of the cap member 520. In other cases, the guide rails 606 may coupled to the inside diameter 500. The guide rails 606 function as a guide to hold the magnet 600 in a particular orientation as the magnet 600 translates inwardly. That is, as the ambient water pressure acting on the outer face of the seal piston 540 overcomes the latching force supplied by the magnet 600, the magnet 600 will be forced inwardly, and the rails 606 may assist in holding the magnet 600 in a particular orientation during the translation. The rails 606 may be constructed of any suitable non-magnetic material, such as plastic. In some cases, the rails 606 may define one or more channels, which channels may enable water flooding into the intermediate chamber 536 to reach the puncture piston 508 (i.e., in the triggered state). The guide rails 606 are optional, and may be omitted in some embodiments. The specification now turns to operation of the illustrative depth trigger mechanism 316 of FIG. 6.

Illustrative depth trigger mechanism 316 of FIG. 6 is shown in the non-triggered state. As the depth trigger mechanism 316 is submerged, the ambient pressure created by the surrounding water increases. Thus, as the depth increases so too does the force created by the ambient pressure pushing against the outer face of the seal piston 540. However, in the embodiments of FIG. 6 the magnet 600 applies a force opposing the force created by the ambient water pressure acting on the outer face the seal piston 540. Nevertheless, at depths above the predetermined depth, the magnet 600 holds the seal piston 540 in sealing relationship with the internal diameter of the aperture 538. Stated otherwise, the magnet 600 (in combination with magnetic material 604) creates a force proportional to the force proportional to the force applied to the seal piston.

As the depth trigger mechanism 316 submerges below the predetermined depth, the force supplied by the magnet 600 is overcome by the ambient pressure of the water acting on the outer face of the seal piston 540, and thus the seal piston 540 and magnet 600 move inwardly enough to allow water to flood the intermediate chamber 536. That is, the seal piston 540 moves to a triggered state, which enables water to flood the intermediate chamber 536. When water enters the intermediate chamber 536, pressure in the intermediate chamber 536 increases significantly. As the pressure increases against the inner face 514 of the puncture piston 508 by the water pressure entering the intermediate chamber 536, the puncture piston 508 is pushed inwardly toward the gas cylinder 314. Movement of the puncture piston 508 and lance 516 thus cause the lance 516 to puncture the seal 547, which inflates lifting bag 312. At some point, the pressure within the intermediate chamber 536 may equalize with the ambient water pressure, and thus the seal piston 540 may once again telescope within the aperture 538 and the magnet 600 again magnetically couple to the cap member 520 and/or the magnetic material 604; however, by this point the seal 547 of the cylinder 314 has been punctured and the lifting bag deployed.

Figure 7:
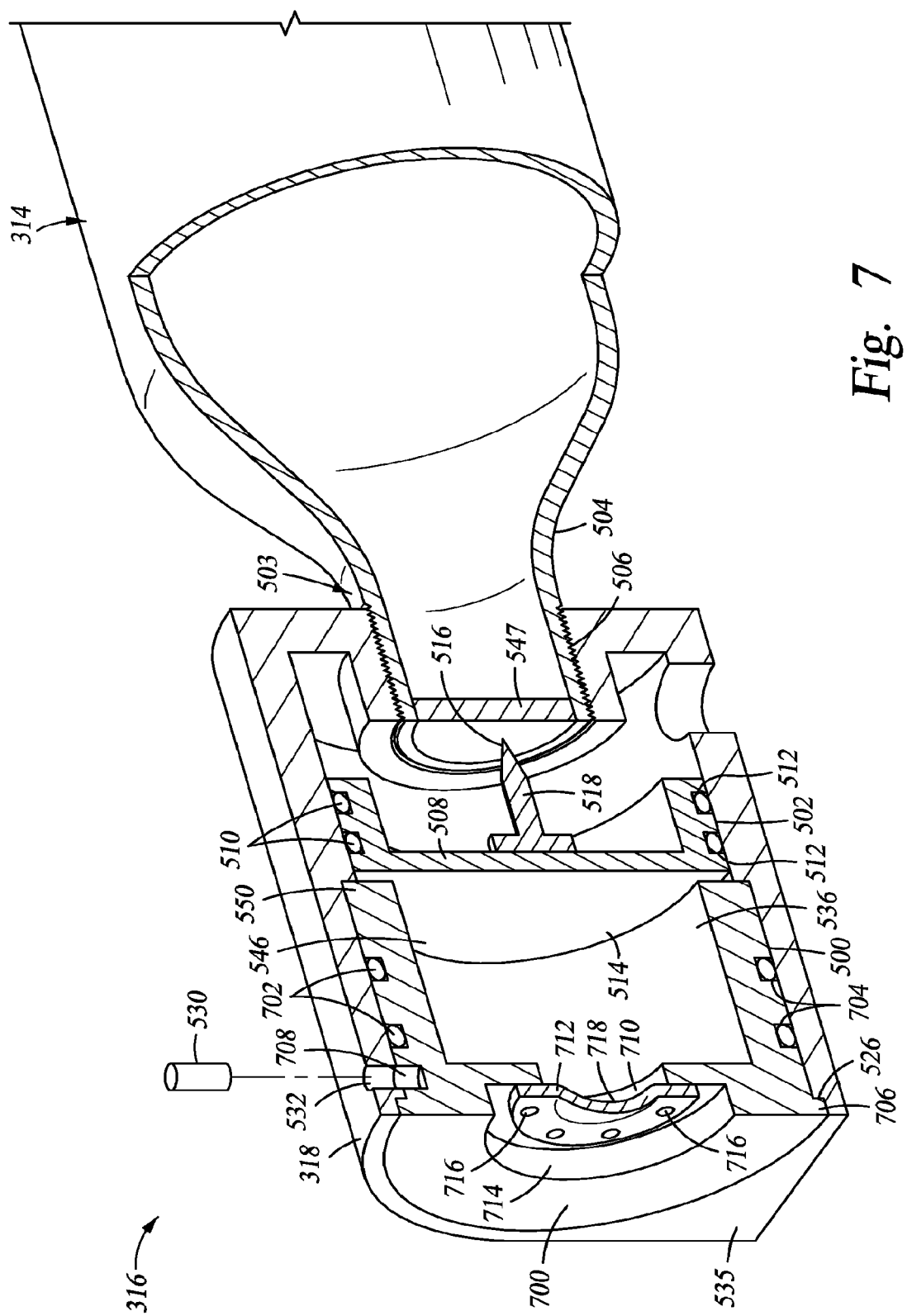
FIG. 7 shows a perspective cross-sectional view of a depth trigger mechanism for a lifting bag system in accordance with at least some embodiments.

FIG. 7 shows a cross-sectional perspective view of a depth trigger mechanism 316 coupled to a gas cylinder 314 in accordance with yet still further embodiments. Many of the components and relationships between components as between FIGS. 5, 6, and 7 are the same. So as not to unduly complicate the description, duplicate components will carry the same reference numbers and will not be specifically re-introduced with respect to FIG. 7.

The illustrative depth trigger mechanism 316 of FIG. 7 comprises a cap member 700. In the illustrative case of FIG. 7, the cap member 700 telescopes within the internal diameter 500 of the cylinder bore. An outside diameter of the cap member 700 seals against the inside diameter 500 of the cylinder bore by way of o-rings 702 within respective annular grooves 704. While FIG. 7 shows two annular grooves 704 and two o-rings 702, one or more o-ring and annular groove systems may be used. Unlike the puncture piston 508, the cap member 700 may be held stationary relative to the outer housing 318 by shoulder region 526 defined in the outer housing 318, and corresponding flange feature 706 defined in the cap member 700. In addition to, or in place of, the shoulder region 526 and flange feature 706, inward movement of the cap member 700 may also be limited by the shoulder created between inside diameter 500 and inside diameter 502. In other embodiments, a single inside diameter may exist within the cylinder bore.

Once the cap member 700 is telescoped within the inside diameter 500, the cap member 520 may be held against outward movement by one or pins 530 telescoped within aperture 532 of the outer housing 318 and into counter-bore 708 in the cap member 700. Use of shoulder region 526 and flange feature 706, and/or the pin 530 and related aperture 532 and counter-bore 708, is merely illustrative. Any suitable mechanism that, once installed, limits the movement of the cap member 700 may be used. Moreover, while illustrative cap member 700 telescopes within and seals against inside diameter 500, the cap member may also telescope over the outer housing 318, and/or seal against the outer face 535 of the outer housing 318.

Still referring to FIG. 7, the illustrative cap member 700 is disposed at the distal end of the cylinder bore opposite the puncture piston 508, and the puncture piston 508 disposed at the proximal end (i.e., closest to the cylinder 314). The volume between the face 514 of the puncture piston 508 and the cap member 700 defines an intermediate chamber 536. The cap member 700 further comprises an aperture 710 that, when not occluded, fluidly couples ambient pressure outside the depth trigger mechanism 316 to the intermediate chamber 536. In a non-triggered state, the aperture 710 is fluidly occluded by a rupture disk 712. The rupture disk 712 is illustrative coupled within a counter-bore 714 by way of a plurality of fasteners 716. In other cases, the rupture disk 712 may be coupled to an inside face of the cap member 700. Other mechanism to couple the rupture disk to the cap member 700 may be equivalently used.

The rupture disk is designed and constructed such that the rupture portion 718 of the rupture disk 712 ruptures or breaks when the differential pressure across the rupture disk 712 meets or exceeds a predetermined pressure. In the embodiments of FIG. 7, the predetermined pressure is directly related to the predetermined depth at which the depth trigger mechanism 316 is design to move to a triggered state and inflate the lifting bag 312. There may be many manufacturers from which suitable rupture disks may be purchased, such as Fike Corporation of Blue Springs, Mo.

As can be appreciated by reference to FIG. 7, the intermediate chamber 536 has few if any components disposed therein in the rupture disk embodiments. Thus, in at least some cases the outer housing 318 may be shortened axially, and likewise the cap member 700 shorted axially, such that rupture disk 712 is physically closer to the puncture piston 508. It is for these reasons that the cap member 700 is presented as different element than cap member 520; however, cap member 520 modified to accept a rupture disk occluding the aperture 538 may be equivalently used, and thus the cap members as between the seal piston embodiments and the rupture disk embodiments need not necessarily be different components.

As with the previous embodiments, FIG. 7 shows the illustrative depth trigger mechanism 316 in the non-triggered state. As the depth trigger mechanism 316 is submerged, the ambient pressure created by the surrounding water increases. Thus, as the depth increases so too does the force created by the ambient pressure pushing against the outer face of rupture portion 718 of the rupture disk 712. However, the rupture portion 718 is designed and constructed to withstand pressures less than a pressure associated with the predetermined depth, and thus the rupture disk fluidly isolates the intermediate chamber 536 at depths above the predetermined depth.

As the depth trigger mechanism 316 of FIG. 7 submerges below the predetermined depth, the mechanical strength of the rupture portion 718 of the rupture disk 712 is overcome, and the rupture portion 718 ruptures (i.e., the triggered state) to enable water to flood the intermediate chamber 536. When water enters the intermediate chamber 536, pressure in the intermediate chamber 536 increases significantly. As the pressure increases against the inner face 514 of the puncture piston 508 by the water pressure entering the intermediate chamber 536, the puncture piston 508 is pushed inwardly toward the gas cylinder 314. Movement of the puncture piston 508 and lance 516 thus cause the lance 516 to puncture the seal 547, which inflates lifting bag 312.

The various embodiments discussed to this point have been with respect to the depth trigger mechanism used in connection with the lifting bag system 208, puncturing a seal of the gas cylinder when the system reaches or exceeds the predetermined depth. However, many of the same principles of operation may be used with respect to the ballast weight system 210, though no lancing operation is needed with respect to the ballast weights.

Figure 8:
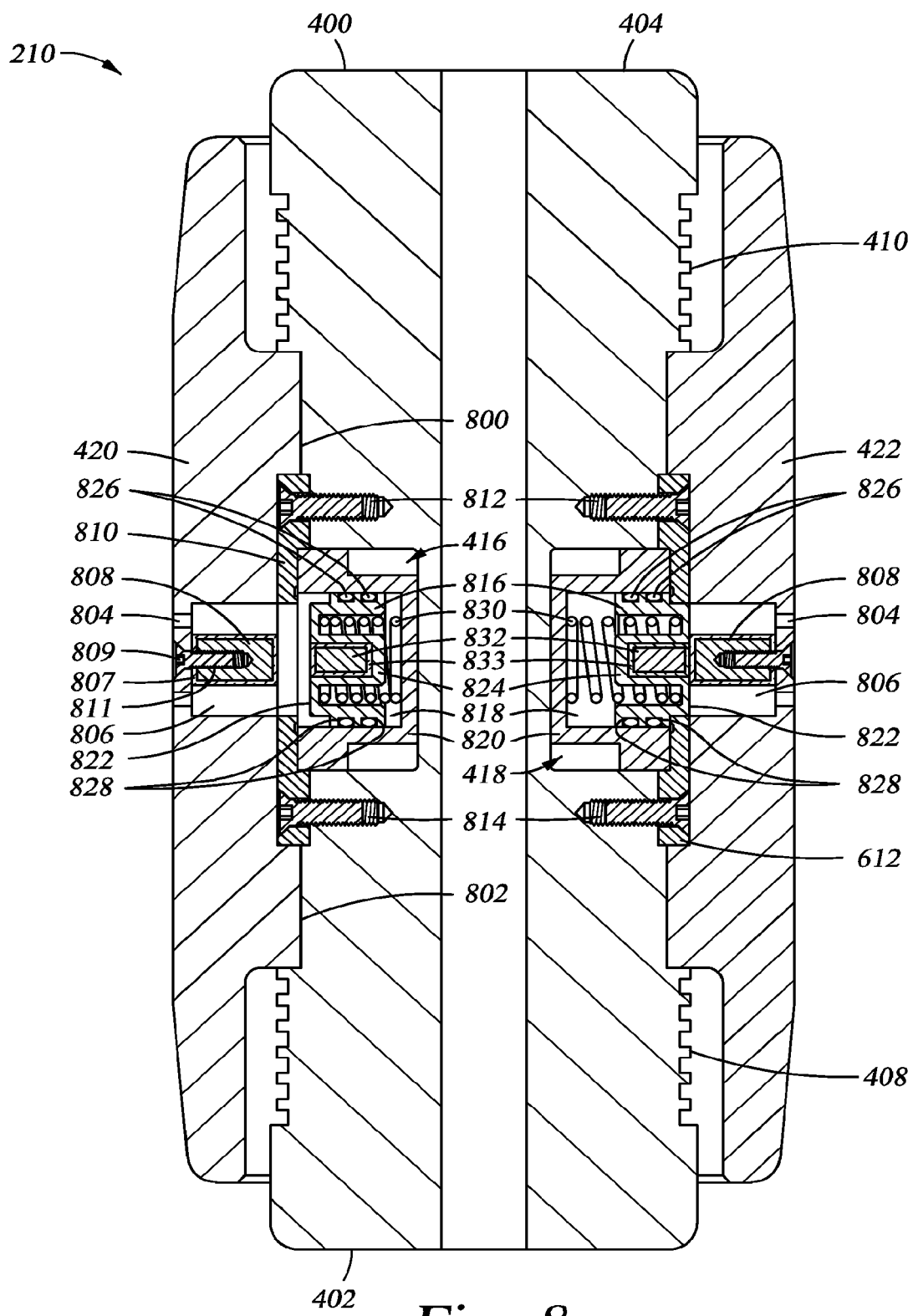
FIG. 8 shows a cross-sectional elevation view of a ballast system in accordance with at least some embodiments.

FIG. 8 shows a cross-sectional elevation view of a ballast system 210 in accordance with at least some embodiments. In particular, FIG. 8 shows the ballast attachment block 400 having the first ballast weight 420 and second ballast weight 422 in an abutting relationship with the ballast attachment block 400. In the embodiments of FIG. 8, depth release mechanism 416 is shown in a triggered state, while depth release mechanism 418 is shown in a non-triggered state. The illustrated ballast attachment block 400 differs from that illustrated in FIG. 4 in that the attachment locations are more delineated, the delineation in the form of reduced outside diameter portions 800 and 802. Moreover, FIG. 8 illustrates that the grooves 408 and 410 may likewise define a smaller outside diameter than more distal portions of the first end 402 and second end 404, respectively. For example, the elongated outer jacket may telescope over an end 402 or 404, and then be held in place by a mechanical member, such as a band that circumscribes the elongated outer jacket at the location of the grooves.

Referring to ballast weight 420 as representative, ballast weight 420 comprises a first aperture 804 in fluid communication with a counter-bore 806. As illustrated, the counter-bore 806 may be circular and has an inside diameter larger than the first aperture 804, but other relationships are contemplated. In other cases, first aperture 804 may be omitted, as sea water may find its way to the trigger mechanism by movement between the ballast weight 420 and the block 400. A magnet 808 is disposed within the counter-bore 806, and is mechanically coupled to the ballast weight 420. In some cases, the magnet 808 may be coupled to the ballast weight 420 by way of a fastener 809 coupled to an internally threaded counter bore 811 in the magnet 808, but any suitable mechanism may be used to couple the magnet 808 to the ballast weight 420. For example, the magnetic may be disposed within a holder that shields the magnet 808 from sea water. The magnet may thus be held in the counter-bore 806 by way of the holder. In some embodiments, the magnet 808 may be disposed within a liner 807 which may protect the magnetic thermally (i.e., insulates) and/or reduces mechanical shock experienced by the magnet.

Illustrative depth release mechanism 416 of FIG. 8 comprises retention plates 612 and 810, which may be attached to the ballast attachment block by way of fasteners within threaded counter-bores 812 and 814. While FIG. 8 illustrates the use of threaded fasteners, any suitable attachment system may be used. The retention plate 810 retains the piston member 816 at least partially within a chamber 818. As illustrated, the chamber 818 is defined within a chamber block member 820, but in other cases the chamber 818 may be defined directly by a counter-bore in the ballast attachment block 400. The piston member 816 defines a retention portion 822 that, in the non-triggered state abuts the magnet 808.

Still referring to FIG. 8, the piston member further comprises chamber portion 824 that resides within the chamber 818. As illustrated, the chamber portion 824 seals against the internal diameter of the chamber 818, for example, by way of o-rings 826 in respective annular grooves 828. Other sealing mechanisms may be used. Also within the chamber 818 is optional spring member in the form of a coil spring 830. The pressure of the gas (e.g., air) within the chamber, as well as the force created by compression of the illustrative coil spring 830, tend to bias the piston member into an extended orientation, as shown by depth release mechanism 418.

In the non-triggered state as shown by depth release mechanism 418 (i.e., in the state where the ballast weight is held against the block 400 by the depth release mechanism), magnet 808 is magnetically coupled to the retention portion 822 of the piston member 816, where the piston member 816 is fully extended. In other cases, the piston member 816 is made of made of a magnetic material, and thus the magnet 808 applies an attractive force to the piston member 816. In some cases, the piston member 816 itself may be magnetized in such a way that there exists a force of attraction between the magnet 808 and the piston member 816 itself. In cases where the piston member 816 is non-magnetic, a magnetic material 832 may be associated with the piston member 816. The magnetic material 832 may be a magnetic but non-magnetized material (e.g., steel), or the magnetic material 832 itself may be magnetized with the poles aligned such that there is an attractive force between the magnetic material 832 and the magnet 808. In some embodiments, the magnetic material 832 may be disposed within a liner 833 which may protect the magnetic material 832 thermally (i.e., insulates) and/or reduces mechanical shock experienced by the magnet.

When the ballast system 210 is at the surface, each piston member 816 will tend to be in an extend orientation (i.e., in the non-triggered state). As the ballast system 210 increases depth in the water, increased pressure (communicated at least in part through the aperture 804 and counter bore 806) will tend to force the piston member 816 to retract into the chamber 818. However, the illustrative coil spring 830 provides a force tending to resist movement of the piston member 816 into the chamber 818. Likewise, the magnet 808 provides a latching force also tending to resist movement of the piston member.

However, when the ballast system 210 reaches or exceeds the predetermined depth, the force applied to the piston member 816 by way of the ambient water pressure overcomes the various latching forces resisting movement of the piston member 816. When the piston member 816 is forced away from the magnet 808, the force holding the ballast weight is lost allowing the ballast weight to fall or be pushed away. Though not shown in FIG. 8 so as not to further complicate the figure, springs 424 set within counter-bores 426 of the block 400 may be used to help eject the ballast weight after the latching force supplied by the magnet 808 and piston member 816 combination is lost.

Figure 9:
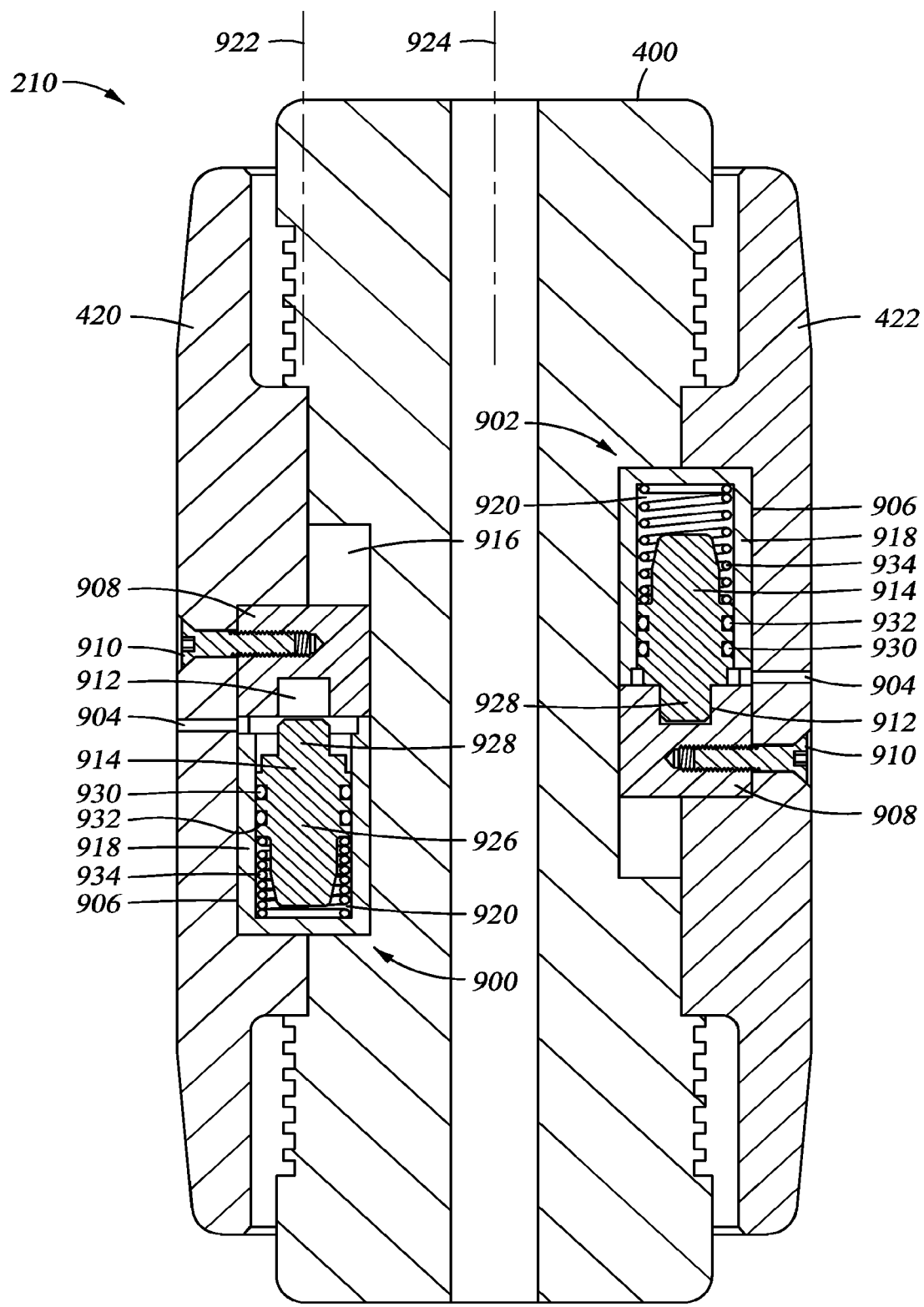
FIG. 9 shows a cross-sectional elevation view of a ballast system in accordance with at least some embodiments.

FIG. 9 shows a cross-sectional elevation view of a ballast system 210 in accordance with another illustrative depth release mechanism. In particular, FIG. 9 shows the ballast attachment block 400 having the first ballast weight 420 and second ballast weight 422 in an abutting relationship with the ballast attachment block 400. In the embodiments of FIG. 9, ballast weight 420 is associated with a depth release mechanism 900, and ballast weight 422 is associated with depth release mechanism 902. Depth release mechanism 900 is shown in a triggered state (i.e., in a state where the ballast weight can fall away from the ballast attachment block 400), while depth release mechanism 902 is shown in a non-triggered state.

Referring to ballast weight 420 as representative, ballast weight 420 comprises an optional first aperture 904 in fluid communication with an inset region 906. In embodiments were the aperture 904 is omitted, the sea water may finds it way to the insert region through other pathways, such as between the ballast weight 420 and the block 400. The ballast weight 420 further comprises a latch member 908 illustratively coupled to the ballast weight 420 by way of a fastener 910. The latch member 908 defines a counter-bore 912 into which a portion of the piston 914 protrudes when the depth release mechanism is in the non-triggered state (as shown however, the depth release mechanism 900 is in the triggered state). A latch member 908 distinct from the balance of the ballast weight 420 enables coupling of the ballast weight 420 to the depth release mechanism 902. In particular, when the ballast weight 420 is coupled at the surface, the piston 914 will be in a non-latched (i.e., extended) orientation. In order to couple the ballast weight 420, the latch member 908 is inserted into operational relationship with the piston 914, and then the latch member 908 is coupled to the ballast weight 420. For example, the ballast attachment block 400 may be designed and constructed to enable the latch member to slide into place by way of a cut-out region 916. In this example situation, the latch member 908 is placed in the cut-out region 916, and then translated such that a portion of the piston 914 telescopes within the counter-bore 912 of the latch member 908. Thereafter, the ballast weight 420 is coupled to the latch member 908 by way of fastener 910. In other cases, the latch member 908 itself may comprise two or more pieces that are then coupled together and coupled to the ballast weight 420, and in such embodiments the cut-out region 916 may be omitted.

Still referring to depth release mechanism 900 as illustrative of both mechanisms, the piston 914 is disposed within a housing 918 mechanically coupled to the ballast attachment block 400. Any suitable mechanism for coupling the housing 918 to the ballast attachment block 400 may be used. The housing 918 defines a chamber 920 within which piston 914 resides, and within which the piston 914 translates. Both the piston 914 and the chamber 920 define a coaxial central axis 922 (illustrated at the top of the drawings), which central axis 922 is parallel to the central axis 924 of the ballast attachment block 400. The piston 914 further comprises chamber portion 926 that resides within the chamber 920 regardless of triggered or non-triggered state, and a retention portion 928 that, in the non-triggered state, is in operational relationship with the counter-bore 912. As illustrated, the chamber portion 926 seals against the internal diameter of the chamber 920, for example, by way of o-rings 930 in respective annular grooves 932. Other sealing mechanisms may be used. Also within the chamber 920 is spring member in the form of a coil spring 934. The pressure of the gas (e.g., air) within the chamber, as well as the force created by compression of the illustrative spring 934, tends to bias the piston 914 into an extended orientation.

Still referring to FIG. 9, but turning to illustrative depth release mechanism 902. Depth release mechanism 902 is shown in the non-triggered state where the piston 914 is in an extended orientation. In the extended orientation, the retention portion 928 is telescoped into, and thus in operational orientation with, the counter-bore 912 of the latch member 908. By way of the operational relationship of the retention portion 928 with the latch member 908, the illustrative ballast weight 422 is latched in place against the ballast attachment block 400. In the orientation shown with respect to depth release mechanism 902, one or both of the air pressure within the chamber 920 and/or the spring 934 provide the force to extend the piston 914.

When the ballast system 210 is at the surface, each piston member 914 will be in an extend orientation (i.e., in the non-triggered state). As the ballast system 210 increases depth in the water, increased pressure (communicated at least in part through the aperture 904) will tend to force the piston 914 to retract into the chamber 920. However, the illustrative spring 934 provides a force tending to resist movement of the piston 914 into the chamber 920.

However, when the ballast system 210 reaches or exceeds the predetermined depth, the force applied to the piston 914 by way of the ambient water pressure overcomes the various latching forces resisting movement of the piston 914. When the piston 914 is forced into the chamber 920 to the extent the retention portion 928 is no longer in operational relationship with the latch member 908, the force holding the ballast weight is lost allowing the ballast weight to fall or be pushed away. Though not shown in FIG. 9 so as not to further complicate the figure, springs 424 set within counter-bores 426 of the ballast attachment block 400 may be used to help eject the ballast.

Figure 10:
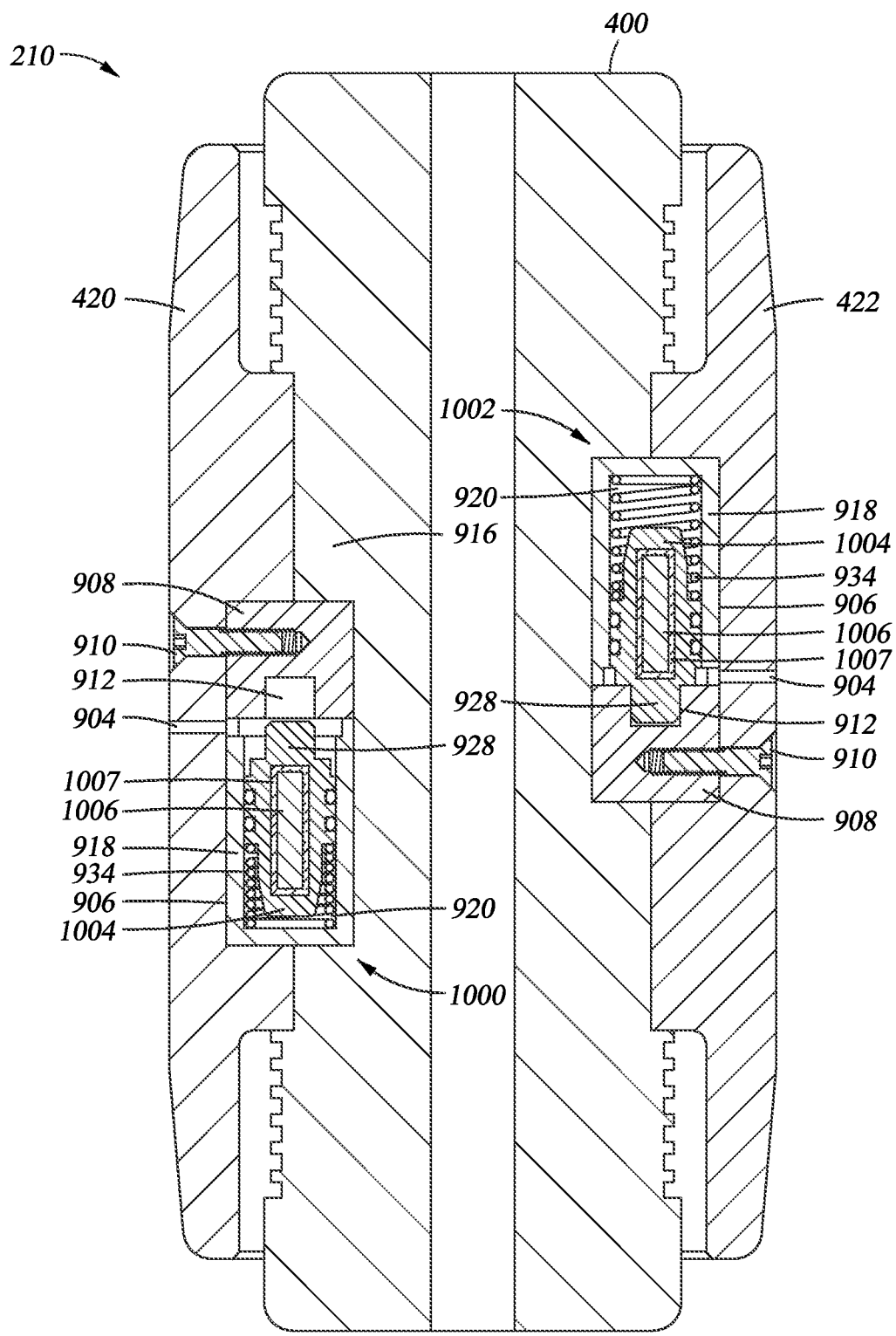
FIG. 10 shows a cross-sectional elevation view of a ballast system in accordance with at least some embodiments.

FIG. 10 shows a cross-sectional elevation view of a ballast system 210 in accordance with yet still further embodiments. In the embodiments of FIG. 10, ballast weight 420 is associated with a depth release mechanism 1000, and ballast weight 422 is associated with depth release mechanism 1002. The depth release mechanisms 1000 and 1002 are similar to the depth release mechanisms 900 and 902, and so as not to unduly complicate the description, components that operate similarly will not be described again here. Much like FIG. 9, depth release mechanism 1000 is shown in a triggered state (i.e., in a state where the ballast weight can fall away from the ballast attachment block 400), while depth release mechanism 1002 is shown in a non-triggered state.

The embodiments of FIG. 10 differ from those of FIG. 9 in that each piston 1004 is associated with a magnet 1006. In accordance with these embodiments, the latch member 908 is constructed, at least in part, of a magnetic material such that the magnetism associated with the piston 1006 causes a magnetic attraction to the latch member 908. Thus, in these embodiments the latching force tending to resist movement of piston 1004 into the chamber 920 is provided, at least in part, by the magnet 1006.

A few points before proceeding. Firstly, while the embodiments of FIG. 10 are shown to have a distinct magnet 1006 coupled to and/or within the piston 1004, in other cases the piston 1004 itself may be magnetized. For example, in one example embodiment each piston 1004 is made of 17-4 PH stainless steel, which stainless steel may be magnetized such that the entire piston 1004 itself is the magnet providing the latching force. Moreover, the latch member 908 may be constructed of 17-4 PH stainless steel such that, if non-magnetized, the piston 1004 will nevertheless be magnetically attracted (either by virtue of the piston 1004 being magnetized or the placement of a magnet in association with the piston 1004). Depending on the size of the piston 1004 and the predetermined depth at which the depth release mechanisms 1000 and 1002 trigger (and the predetermined depths need not be the same), additional latching force may be supplied by magnetizing the latching member 908 with the magnetic poles aligned in such a way that attractive force exists between the components. Further still, the embodiments of FIG. 10 show a spring 934 within the chamber 920. Depending again on the size of the various components and the predetermined depths, the spring 934 may be present to provide additional latching forces; however, in other cases the spring 934 may be omitted if the piston 1004 and/or latching member 908 provide sufficient latching force. Regardless, above the predetermined depth a force is provided that is proportional to the force applied to the piston, thus keeping the system in a non-triggered state.

When the ballast system 210 is at the surface, each piston member 1004 will be in an extend orientation (i.e., in the non-triggered state). As the ballast system 210 increases depth in the water, increased pressure (communicated at least in part through the aperture 904) will tend to force the piston 1004 to retract into the chamber 920. However, the magnetic forces associated with one or both the piston 1004 and the latch member 908 provide a force tending to resist movement of the piston 1004 into the chamber 920. Moreover, in cases where a spring 934 is used, spring 934 may also contribute to the latching force.

However, when the ballast system 210 reaches or exceeds the predetermined depth, the force applied to the piston 1004 by way of the ambient water pressure overcomes the various latching forces resisting movement of the piston 1004. When the piston 1004 is forced into the chamber 920 to the extent the retention portion 928 is no longer in operational relationship with the latch member 908, the force holding the ballast weight is lost enabling the ballast weight to fall or be pushed away. Though not shown in FIG. 10 so as not to further complicate the figure, springs 424 set within counter-bores 426 of the ballast attachment block 400 may be used to help eject the ballast.

Much like the previous embodiments, magnets 1006 may be subject to demagnetization when exposed to excessive heat and/or thermal shock. Thus, in some embodiments the each magnet 1006 may be disposed within liner 1007 which may protect the magnetic thermally (i.e., insulates) and/or reduces mechanical shock experienced by the magnet.

Figure 11:
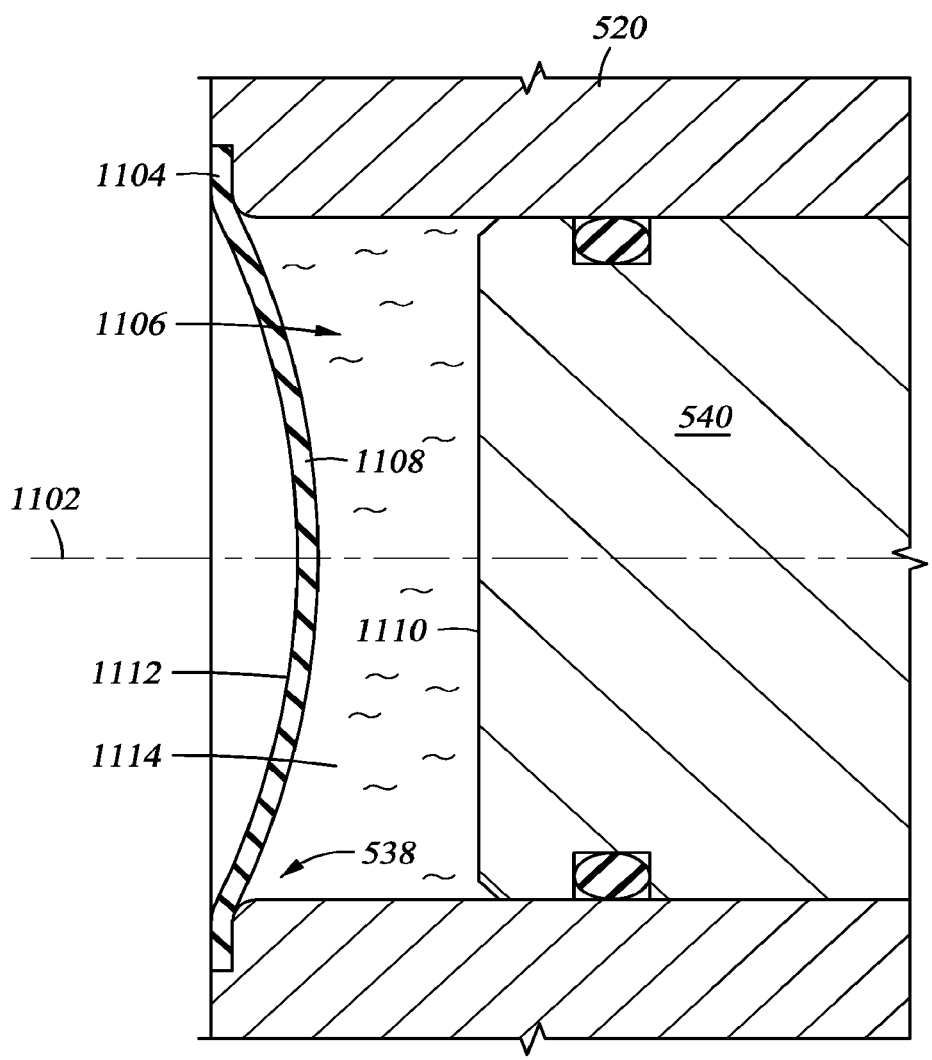
FIG. 11 shows a system to isolate the seal piston from sea water in accordance with at least some embodiments.

In the embodiments of the depth trigger mechanism for the lifting bag system, the discussion has indicated that the seal pistons are exposed to the pressure of the water such that increasing pressure moves the seal piston, eventually from a non-triggered state to a triggered state. In some cases, the seal piston is directly exposed to the sea water and pressure, but in other cases the seal piston may be shielded from the sea water, but nevertheless exposed to the increasing pressure. FIG. 11 shows a cross-sectional view of a portion of a depth trigger mechanism 1100 to discuss various embodiments of shielding the seal piston from the sea water. In particular, the seal piston 540 is shown disposed with the cap member 520, but only a portion of the cap member 520 is illustrated. The seal piston 540 defines a central axis 1102 along which the seal piston moves. The depth trigger mechanism 1100 further comprises a resilient member 1104 coupled over the aperture 538. More particularly, the resilient member 1104 is sealed against the outer cap member 520 such that the resilient member 1104 fluidly isolates the volume 1106 from the ambient sea water. The volume 1106 defined by the inside surface 1108 of the resilient member 1104 and outer face 1110 of the seal piston 540 is filled with a non-compressible fluid 1114, such as oil, filtered water, or alcohol. The resilient material may be any suitable material, such as rubber or resilient plastic.

In operation, ambient pressure of the sea water presses against the outer surface 1112 of the resilient member 1104. Responsive to the pressure, the resilient material presses on the non-compressible fluid 1114, which in turn presses against the outer face 1110 of the seal piston 540. Movement of the piston caused by the increases in ambient pressure change the operational state from non-triggered to triggered as discussed for the various embodiments above. However, because the seal piston is not exposed to the sea water, the piston is less likely to experience fouling, such as by barnacles. Moreover, if the seal piston is not exposed to sea water, the choice of materials for the piston increases from not-only the copper-based alloys, but also stainless steels and even high density plastics. When the seal piston 540 moves to a triggered state, the resilient member in these embodiments may itself rupture.

Figure 12:
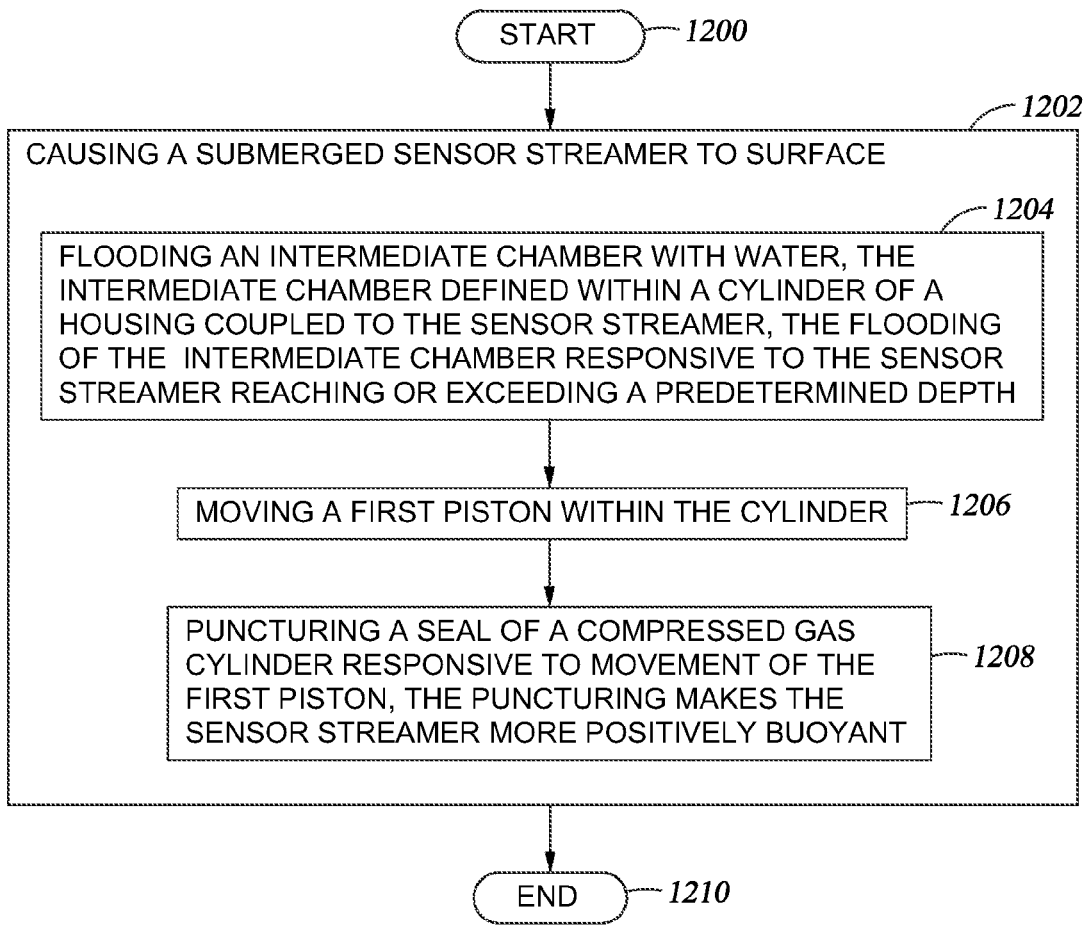
FIG. 12 shows a method in accordance with at least some embodiments.

FIG. 12 shows a method in accordance with at least some embodiments. In particular, the method starts (block 1200) and comprises causing a submerged sensor streamer to surface (block 1202). The causing the submerged sensor streamer to surface may comprise: flooding an intermediate chamber with water, the intermediate chamber defined within a cylinder of a housing coupled to the sensor streamer, the flooding of the intermediate chamber responsive to the sensor streamer reaching or exceeding a predetermined depth (block 1204); and responsive to flooding the intermediate chamber moving a first piston within the cylinder (block 1206); and thereby puncturing a seal of a compressed gas cylinder responsive to movement of the first piston, the puncturing makes the sensor streamer more positively buoyant (block 1208). Thereafter the method ends (block 1210).

Figure 13:
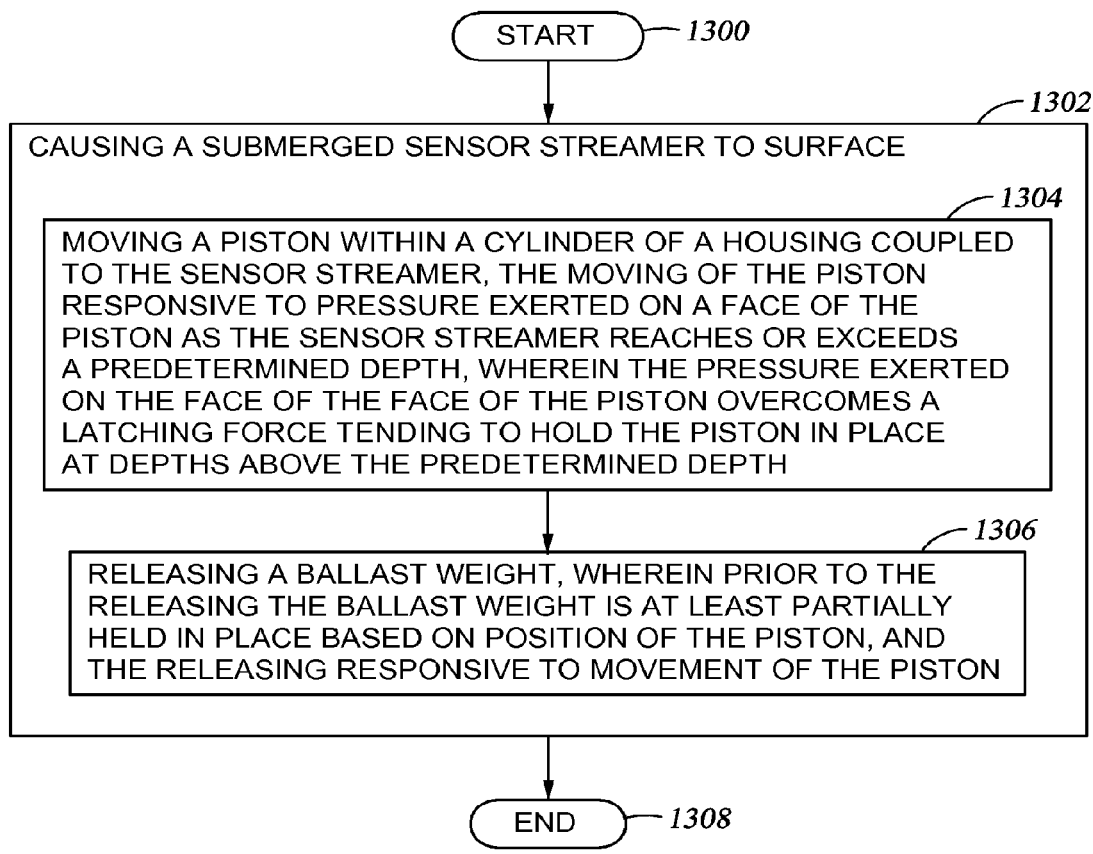
FIG. 13 shows a method in accordance with at least some embodiments.

FIG. 13 shows a method in accordance with at least some embodiments. In particular, the method starts (block 1300) and comprises causing a submerged sensor streamer to surface (block 1302). The causing the submerged sensor streamer to surface may comprise: moving a piston within a cylinder of a housing coupled to the sensor streamer, the moving of the piston responsive to pressure exerted on a face of the piston as the sensor streamer reaches or exceeds a predetermined depth, wherein the pressure exerted on the face of the piston overcomes a latching force tending to hold the piston in place at depths above the predetermined depth (block 1304); and responsive to the piston overcoming the force that latches the piston releasing a ballast weight, wherein prior to the releasing the ballast weight is at least partially held in place based on position of the piston, and the releasing responsive to movement of the piston (block 1306). Thereafter the method ends (block 1308).

References to "one embodiment", "an embodiment", "a particular embodiment", "an example embodiment" and "some embodiments" indicate that a particular element or characteristic is included in at least one embodiment of the invention. Although the phrases "one embodiment", "an embodiment", "a particular embodiment", "an example embodiment" and "some embodiments" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. For example, a retriever system may comprise just a lifting bag system, or just a ballast weight system. It is intended that the following claims be interpreted to embrace all such variations and modifications.

What is claimed is:

1. A method comprising:
    causing a submerged sensor streamer to surface by
        moving a piston within a cylinder of a housing coupled to the sensor streamer, the moving of the piston responsive to pressure exerted on a face of the piston as the sensor streamer reaches or exceeds a predetermined depth, wherein the pressure exerted on the face of the piston overcomes a latching force tending to hold the piston in place at depths above the predetermined depth; and responsive to the piston overcoming the force that latches the piston
        releasing a ballast weight, wherein prior to the releasing the ballast weight is at least partially held in place based on position of the piston, and the releasing responsive to movement of the piston.

2. The method of claim 1 wherein releasing the ballast weight further comprises retracting a latch member coupled to the piston, the retracting moves the latch member away from an aperture associated with the ballast weight.

3. The method of claim 1 wherein moving the piston further comprises overcoming a latching force supplied, at least in part, by a spring.

4. The method of claim 1 wherein moving the piston further comprises overcoming a latching force supplied, at least in part, by a magnet.

5. The method of claim 4 wherein overcoming the latching force supplied by the magnet further comprises overcoming the latching force where the piston is magnetized.

6. The method of claim 4 wherein overcoming the latching force supplied by the magnet further comprises overcoming the latching force where the piston has a magnet disposed therein.

* * * * *